US012170699B2

(12) United States Patent
Koehler

(10) Patent No.: US 12,170,699 B2
(45) Date of Patent: Dec. 17, 2024

(54) SYSTEM AND METHOD FOR MANAGING GRAPHIC USER INTERFACE (GUI) FOR DESKTOP AND MOBILE DISPLAYS

(71) Applicant: Juergen Koehler, Algermissen (DE)

(72) Inventor: Juergen Koehler, Algermissen (DE)

( * ) Notice: Subject to any disclaimer, the term of this patent is extended or adjusted under 35 U.S.C. 154(b) by 0 days.

(21) Appl. No.: 18/408,275

(22) Filed: Jan. 9, 2024

(65) Prior Publication Data

US 2024/0333782 A1    Oct. 3, 2024

Related U.S. Application Data

(63) Continuation-in-part of application No. 29/875,242, filed on May 1, 2023, and a continuation-in-part of application No. 18/194,470, filed on Mar. 31, 2023, now Pat. No. 11,871,153.

(51) Int. Cl.
*H04L 65/403* (2022.01)
*H04N 7/15* (2006.01)

(52) U.S. Cl.
CPC ......... *H04L 65/4046* (2013.01); *H04N 7/157* (2013.01)

(58) Field of Classification Search
None
See application file for complete search history.

(56) References Cited

U.S. PATENT DOCUMENTS

| | | | |
|---|---|---|---|
| 9,733,886 B2 | 8/2017 | Lieb et al. | |
| 11,317,060 B1 * | 4/2022 | Libin | H04N 7/157 |
| 11,871,153 B1 * | 1/2024 | Koehler | G06F 3/04845 |
| 2009/0037827 A1 * | 2/2009 | Bennetts | H04N 7/147 715/753 |
| 2015/0180919 A1 * | 6/2015 | Brunson | H04L 65/4046 709/204 |
| 2016/0072863 A1 * | 3/2016 | Wu | H04L 65/1089 715/753 |
| 2017/0353694 A1 * | 12/2017 | Yoakum | G06F 3/165 |
| 2023/0353835 A1 * | 11/2023 | Springer | G06F 3/0486 |
| 2024/0040083 A1 * | 2/2024 | Ryskamp | G06F 40/166 |

FOREIGN PATENT DOCUMENTS

| | | |
|---|---|---|
| EP | 0616448 B1 | 2/2004 |
| WO | 2012166827 A2 | 4/2014 |

* cited by examiner

*Primary Examiner* — Stella L. Woo

(57) ABSTRACT

A system and method are used to manage GUI for group video calls. The method ensures effective communication and control over shared video content during group video calls. The method enables to combine feed videos from a plurality of attendee accounts and other shared video content to be displayed in one single slide. Further, the method allows control over slide presentations and positioning of participant videos by cursor movement of the host account holder or the presenter. This allows the participants to follow the presenter, while viewing the presentation slides and other feed videos. Furthermore, the method allows users to switch mouse cursor control and feed video positions between the presenter and the participants by clicking on the video on a primary slot. Additionally, the host has special controls that may be passed to a selected number of participants and the participant feed videos are arranged in two sections.

29 Claims, 41 Drawing Sheets

SYSTEM AND METHOD FOR MANAGING GRAPHIC USER INTERFACE (GUI) FOR DESKTOP AND MOBILE DISPLAYS

The current application is a continuation-in-part (CIP) application of the U.S. non-provisional utility application Ser. No. 18/194,470 filed on Mar. 31, 2023. The current application is a CIP application of the U.S. non-provisional design application Ser. No. 29/875,242 filed on May 1, 2023.

FIELD OF THE INVENTION

The present invention relates generally to a method for managing GUI (graphic user interface) for group video calls. More specifically, the present invention provides a system and a method that facilitates users to arrange host and participant videos on a desktop, tablet, or mobile display in such a way that important parts of the shared screen are made visible or are unobstructed.

BACKGROUND OF THE INVENTION

In video conference tools (i.e. Zoom, Google Meets, Apple FaceTime) participant videos and shared content (i.e. slides, screen contents) are separated. The disadvantage of large physical proximity between objects and people on a computer screen is that the human eye cannot focus on the content and the person at the same time. The eye must constantly move between object and face to feel connected to the person speaking or audience speaking to. The user either has to focus on an object or the face or switch between them. Frequent switching exhausts attention faster and shortens the cognitive attention span. Less attention leads to less cognition of shared content and thus harms the viewer's information processing. In other words, less information is processed, or the viewer's mind numbs or distracts itself (process skipping). Seeing a human face and an object at the same time reduces the likelihood of process skipping. The more physical proximity between objects and people the more alike they are judged to be. Thus, proximity of face/person to speaking points/objects/diagrams/images boosts association of (good, successful) content with that specific person, reduces cognitive fatigue, increases attention span and better information processing, which leads to better comprehension of shared content. Further, the more often you see something the more it becomes an unconscious assumption about the world. So, repeatedly (screen after screen, or slide after slide) seeing a person's face next to good content leads to increasing automatic association of the person with the ideas and successes (entrenchment effect). However, when a group of participant videos (for example 4 participants) is following the mouse cursor movement while a screen is shared, the view of the shared screen may sometimes be obstructed. In other words, participant videos following a mouse cursor take up significant screen space.

An objective of the present invention is to provide a system and a method for managing GUI for group video calls, wherein the present invention can address the above-mentioned problems. By utilizing the present invention, all attendees of a video call can ensure that effective communication and control over shared video content would be made possible. The present invention combines several aspects of mouse movements, remotely controlling presentation slides, sharing previous conference videos, switching control of presentation pointer and feed videos, managing controls, arranging attendee feed videos in separate pages, etc. into one tool.

SUMMARY OF THE INVENTION

The present invention provides a system and a method of managing GUI for group video calls. By utilizing the present invention, all attendees of a video call can ensure that effective communication and control over shared video content is made possible without creating confusion and disturbance in group calls. In a preferred embodiment, the system of the present invention enables to combine participant videos, host video, and other shared video content to be displayed in one single slide. Further, the present invention allows control over slide presentations and positioning of the other participant videos by cursor movement of the host or the presenter. This allows the participants to follow the presenter (host), while viewing the presentation slides and the user videos together at the same time. Furthermore, the present invention allows users to switch mouse cursor control, and feed video positions between the presenter and the participants by clicking on the video of the presenter. Additionally, display of the feed videos of the participant accounts are divided into two different screens and the host is provided with additional controls. This is because sometimes only the presenter in the primary slot who is in control of the mouse movement wants to be seen and not the audience. To that end, the proximity between presenter in the primary slot and the audience in the secondary slots is increased to keep more of the important parts of the shared screen visible. Thus, the present invention is a simple and user-friendly system and method, that enables efficient management of GUI for group virtual conference calls.

BRIEF DESCRIPTIONS OF THE DRAWINGS

DETAILED DESCRIPTION OF THE INVENTION

All illustrations of the drawings are for the purpose of describing selected versions of the present invention and are not intended to limit the scope of the present invention.

Figure 1:
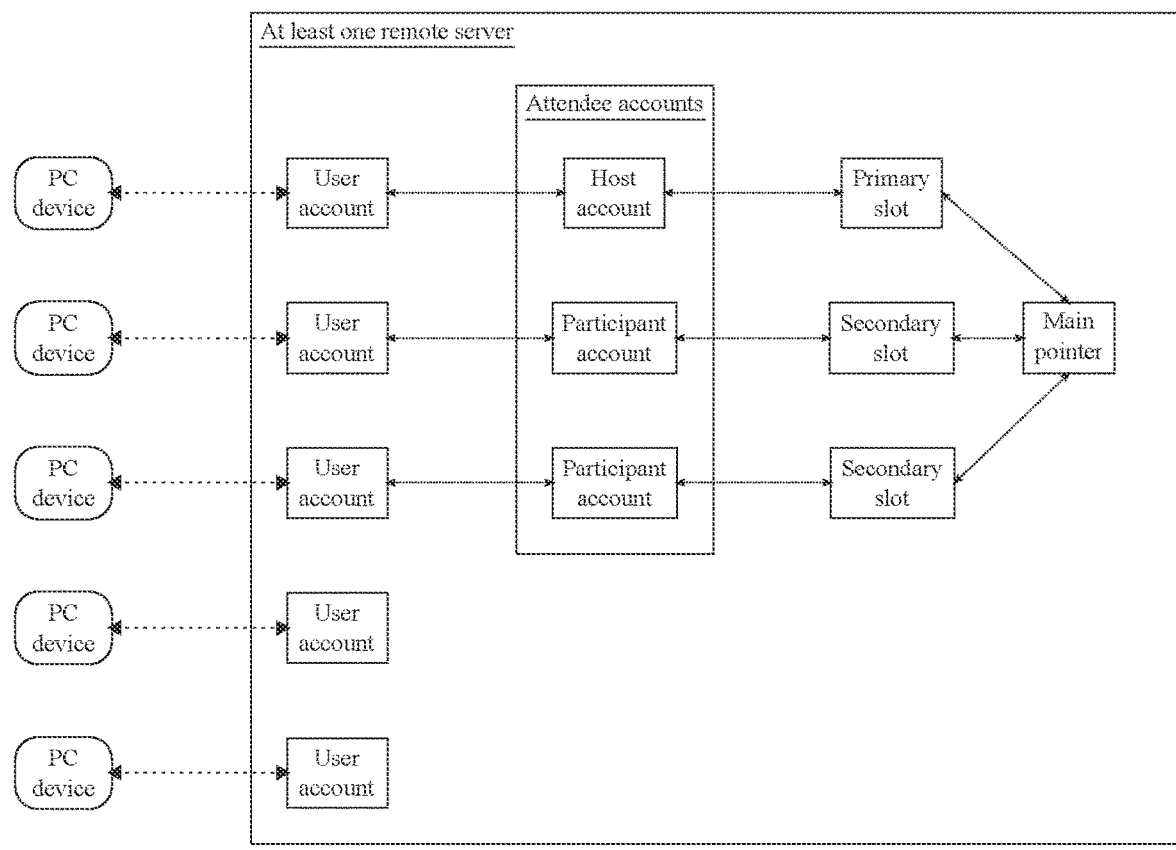
FIG. 1 is a schematic view showing the overall system of the present invention.

The present invention provides a system and a method of managing GUI for group video calls. The present invention enables to combine participant videos, host video, and other shared video content to be displayed in one single slide. The present invention also allows slide presentation and positioning of other participant videos to be controlled by a cursor movement of the host or the presenter. The following description is in reference to FIG. 1 through FIG. 41. As can be seen in FIG. 1, the system used to implement the method of the present invention is provided with a plurality of user accounts managed by at least one remote server (Step A). Each of the plurality of user accounts is associated with a corresponding user personal computing (PC) device. More specifically, each of the plurality of user accounts is tied to a single user who is able to interact, participate, and operate the corresponding user PC device during a group video call. The corresponding user PC device allows a user to interact with the present invention and can be, but is not limited to, a smart-phone, a laptop, a desktop, or a tablet PC. To that end, the present invention works on operating systems, mobile applications, and/or may be embedded into websites. The remote server is used to facilitate communication between the plurality of user accounts. Moreover, the remote server is used to execute a number of internal processes for the present invention and is used to store message data.

In order to accomplish the above-mentioned functionalities, the system used to execute the method of the present invention provides at least one virtual conference session managed by the remote server (Step B). The virtual conference session is an online interactive session where group video or audio calls are conducted between a selected number of users. Further, the virtual conference session may apply to audio only applications, video only applications, or a mix of some users using audio and some users using video. The virtual conference session includes a plurality of attendee accounts, a main pointer, a primary slot, and at least one secondary slot. The attendee accounts are the user accounts of the selected number of users that choose to participate in the virtual conference session and are consequently designated from the plurality of user accounts. The attendee accounts include a host account and at least one participant account. In the preferred embodiment, the host account is tied to the user who initially logs in to the system through the corresponding PC device and creates an online conference room or workspace to conduct the virtual conference session. The specific URL (uniform resource locator) for the online conference room is shared as part of an invitation by the host account to the participant account. A user of the participant account enters the virtual conference session after accepting the invitation through the corresponding PC device. In an alternate embodiment, the virtual conference session may also comprise asynchronous group calls, wherein each user of the participant account joins at a different time. The primary slot and the secondary slot are used to display the feed videos of the attendee accounts from their corresponding PC device. According to the preferred embodiment, the primary slot is graphically configured in relation to the main pointer in order to show the visual primacy of its feed video over the feed video shown in the secondary slot. In the preferred embodiment, the main pointer is a cursor arrow. However, the main pointer can take any other shape such as a hand shape, a finger shape, an alphabet shape, etc., that is known to one of ordinary skill in the art. More specifically, the primary slot is configured either to follow the main pointer during the virtual conference session or to be pinned to a primary desired location during the virtual conference session. The primary desired location may be any location on the screen that is visible during the virtual conference session. Further, the secondary slot is configured to be pinned to a secondary desired location during the virtual conference session. Preferably, the secondary desired location is along a margin or corner on the screen, such that any shared content of the virtual conference session is not obstructed. However, the secondary desired location may comprise any other location as well, as long as the intents of the present invention are not altered.

In order to accomplish the functionalities of the present invention, the overall process of the present invention begins by receiving a feed video from each attendee account with the corresponding PC device (Step C). A feed video is a live video/audio recording that is streamed from the camera and/or microphone of each attendee from their corresponding PC. To that end, when the host account enables access to a camera and/or microphone of the corresponding PC device, the host account enters the virtual conference session with their feed video. Similarly, when the participant account enables access to a camera and/or microphone of the corresponding PC device, the participant account enters the virtual conference session. In other words, when the camera access for the corresponding PC device of each of the attendee account is turned on, the feed video of each attendee account is activated. However, the feed video may be a photograph, a picture, or any visual or audio content that each attendee decides to share with their corresponding PC device.

Figure 8:
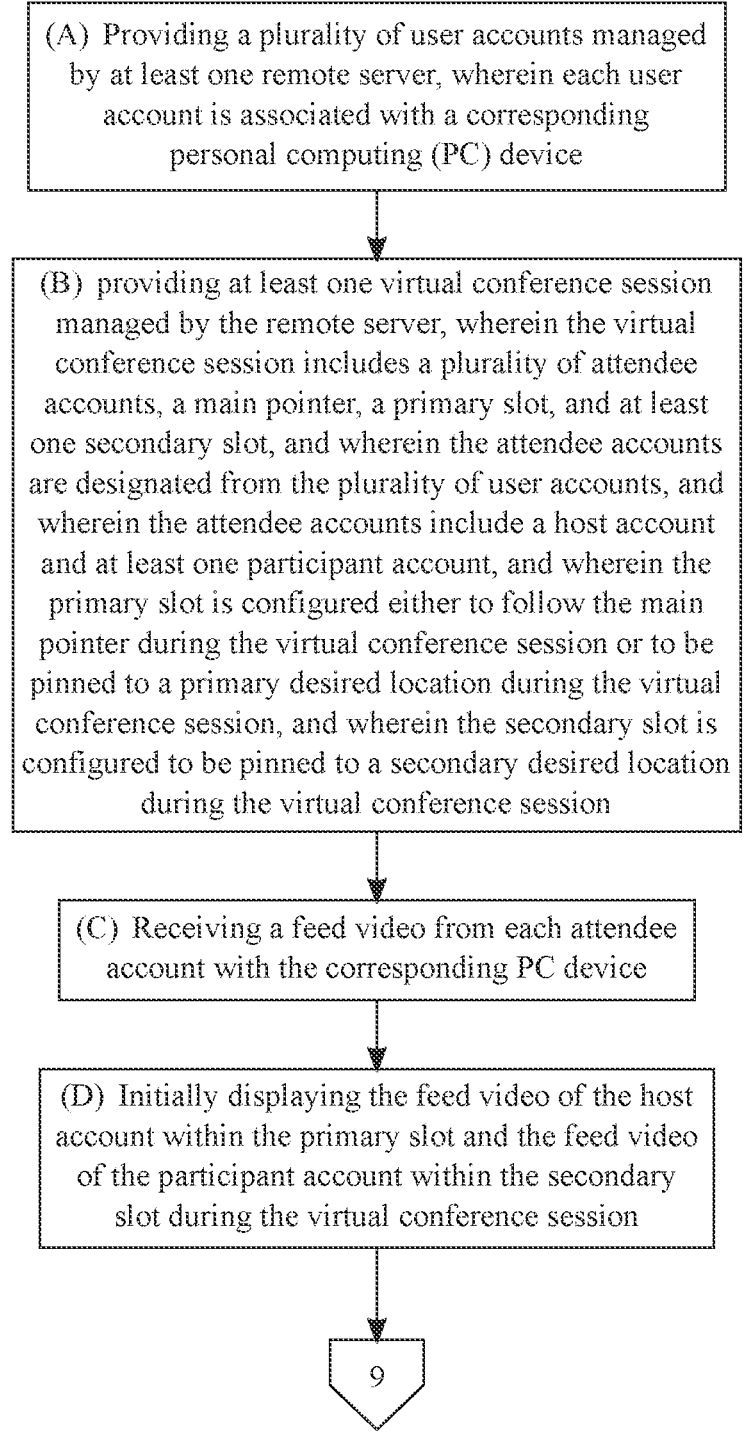
FIG. 8 is a flowchart depicting an overall process of a method according to the present invention.

As can be seen in FIG. 8, the overall process of the present invention continues by initially displaying the feed video of the host account within the primary slot and the feed video of the participant account within the secondary slot during the virtual conference session (Step D). In other words, the primary slot is the graphical space where the host account's video is displayed initially, and the at least one secondary slot is the graphical space where the at least one participant account's video is initially displayed. As seen in FIG. 2 through FIG. 7, these contrastable graphical spaces enable easier identification of the feed video of the host account from the rest of the feed video of the participant account.

It is an aim of the present invention to enable switching or transferring of control between the plurality of attendees in the virtual conference session, so that effective communication and interaction may be made possible among the attendees during a presentation. Accordingly, the overall process of the present invention continues by prompting the participant account to graphically click on the primary slot with the corresponding PC device in order to switch the feed video of the participant account into the primary slot (Step E). For example, if a host X is displaying a presentation slide in the background and a participant Y has something to contribute in reference to the presentation slide, or if participant Y has something completely different to share from corresponding PC of participant Y to the plurality of attendees, participant Y can take control of the meeting by clicking on the video of the current host X in the primary slot.

The overall process of the present invention continues by displaying the feed video of the participant account within the primary slot and the feed video of the host account within the secondary slot during the virtual conference session (Step F), if the primary slot is graphically clicked by the participant account. Continuing with the previous example, if participant Y clicks on the video of host X within the primary slot, the feed videos switch and now the feed video of participant Y from the corresponding PC device of participant Y is placed within the primary slot and the feed video of initial host X from the corresponding PC device of host X is placed within the secondary slot. Thus, participant Y is able to now lead the virtual conference session.

Figure 9:
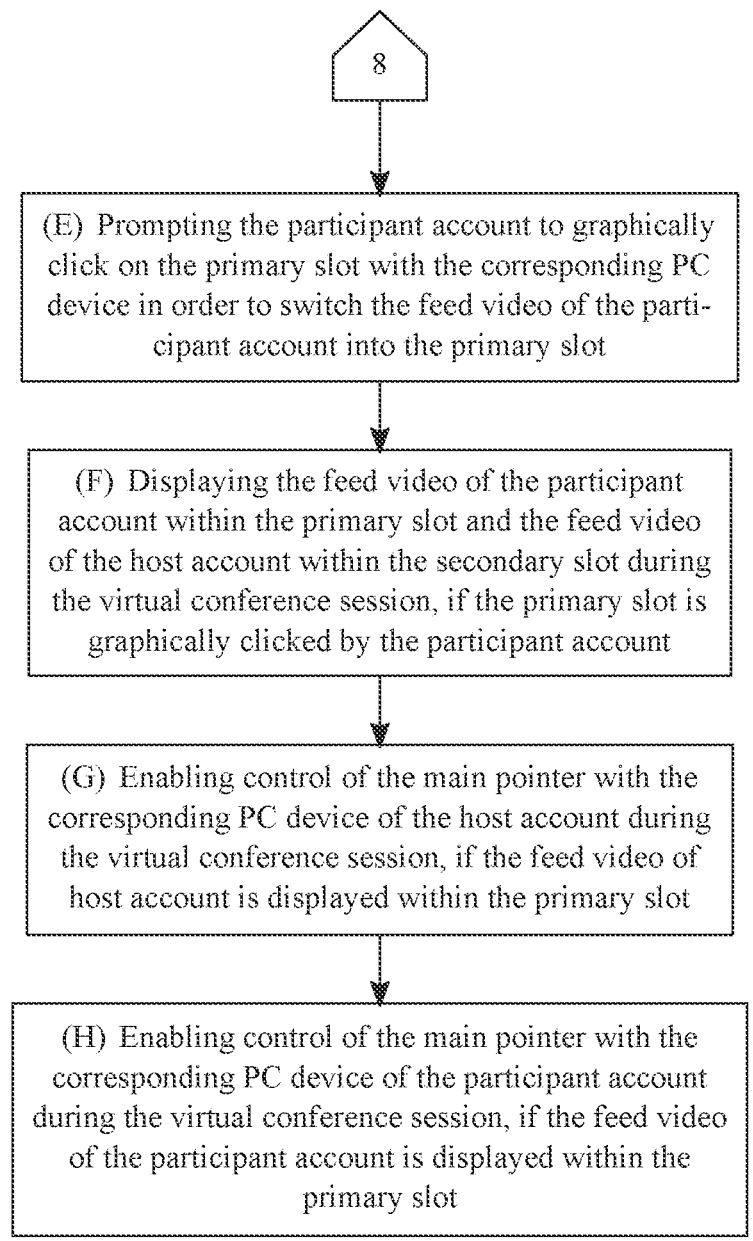
FIG. 9 is a flowchart depicting a continuation of the overall process of the method according to the present invention.

Control of the virtual conference session further implies control of the main pointer. As can be seen in FIG. 9, the overall process of the present invention further continues by enabling control of the main pointer with the corresponding PC device of the host account during the virtual conference session (Step G), if the feed video of host account is displayed within the primary slot. This is so that, the host account who is in charge of leading the virtual conference session may move the main pointer anywhere around the display page. This feature is beneficial because depending on the presentation slide or any other video feed that the host account is displaying, the host may need to move the main pointer for better view or better access. Further, the main pointer may be moved just based on positional preference of a user of the host account. More specifically, controlling of the main pointer would be enabled to the host account only if the feed video of host account is displayed within the primary slot.

As previously discussed, anyone from the plurality of attendee accounts may take control of the virtual conference session by graphically clicking on the video in the primary slot, according to the present invention. Accordingly, the overall process of the present invention further continues by enabling control of the main pointer with the corresponding PC device of the participant account during the virtual conference session (Step H), if the feed video of the participant account is displayed within the primary slot. Continuing with the previous example, control switch happens when participant Y clicks on the primary slot. Subsequently, the primary slot now carries participant Y's video feed. Accordingly, the control of the presentation is now in the hands of participant Y and hence participant Y can now control the main pointer as well with the corresponding PC device of participant Y, so as to effectively communicate with other attendees of the meeting.

Figure 10:
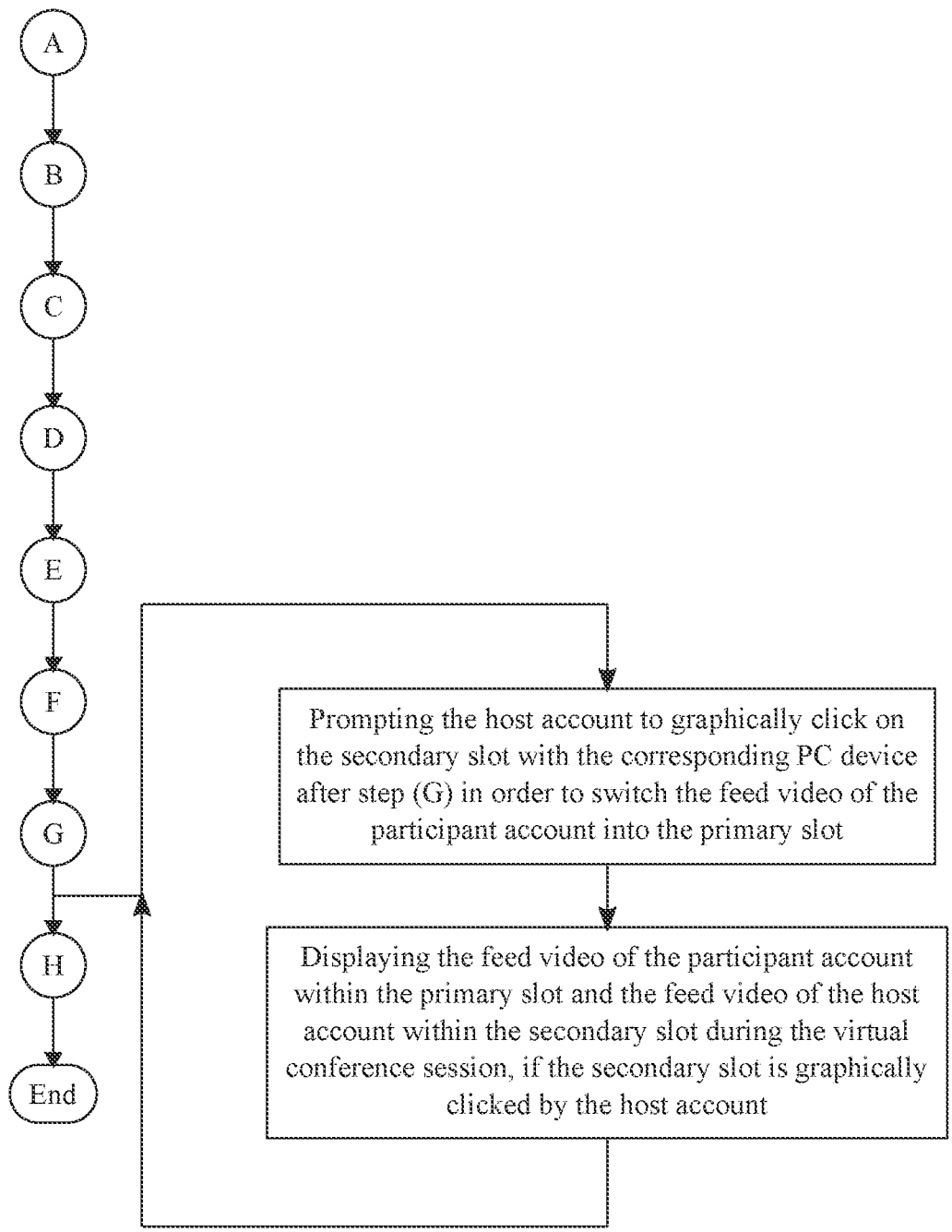
FIG. 10 is a flowchart depicting a subprocess of prompting the host account to graphically click on the secondary slot and displaying the feed video of the participant account within the primary slot during the virtual conference session.

As can be seen in FIG. 10, a subprocess of the present invention comprises the steps of prompting the host account to graphically click on the secondary slot with the corresponding PC device after Step G in order to switch the feed video of the participant account into the primary slot. For example, if the host X wants to take over control of the virtual conference session back from participant Y, then the host X has to graphically click on the secondary slot with the corresponding PC device of the host account. The subprocess continues by displaying the feed video of the host account within the primary slot and the feed video of the participant account within the primary slot and the feed video of the host account within the secondary slot during the virtual conference session, if the secondary slot is graphically clicked by the host account. In other words, based on the previous example, following clicking of the secondary slot, the feed video from corresponding PC device of the host X is displayed in the primary slot and the feed video from the corresponding PC device of participant Y is displayed in the secondary slot.

Figure 11:
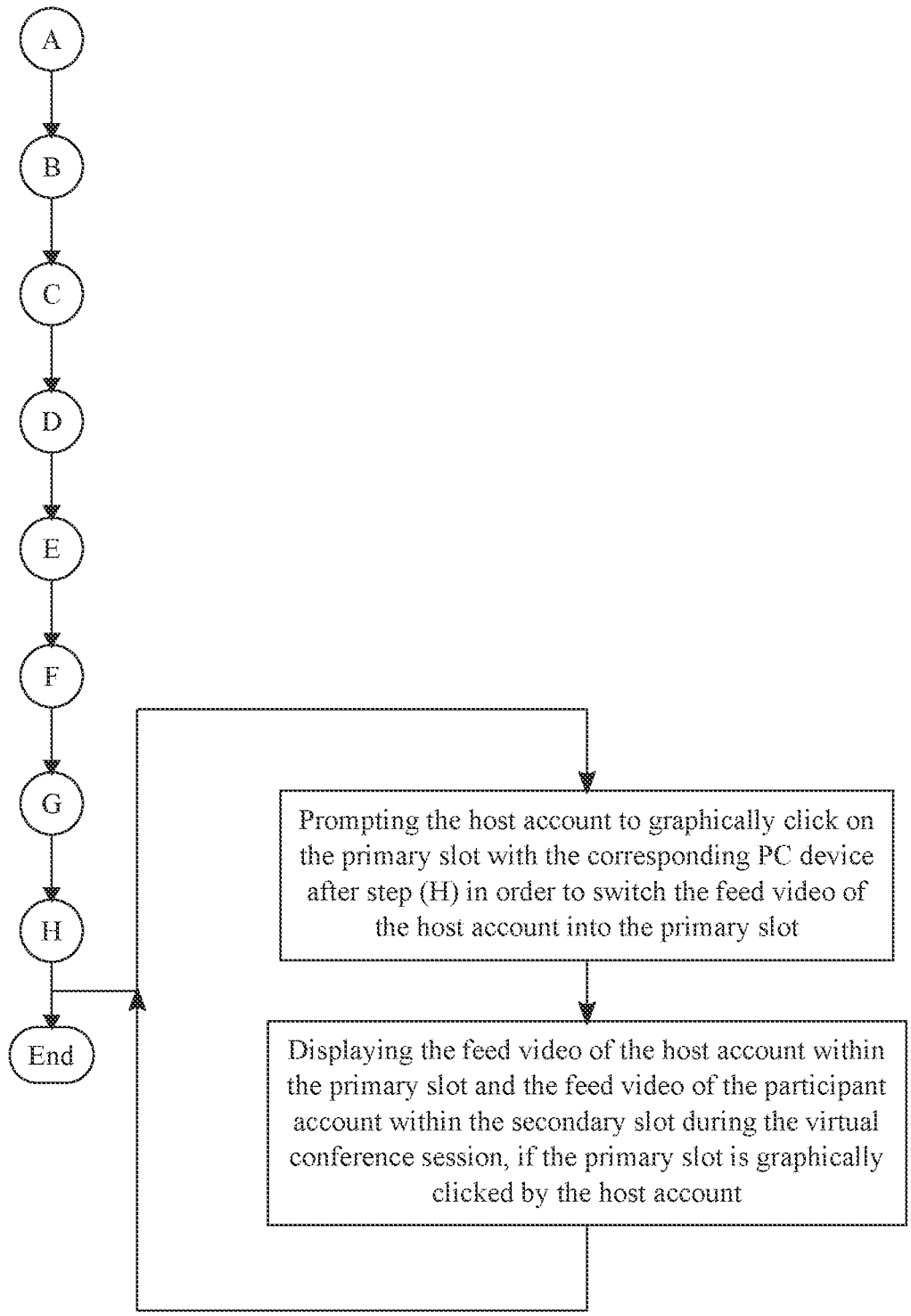
FIG. 11 is a flowchart depicting a subprocess of prompting the host account to graphically click on the primary slot and displaying the feed video of the host account within the primary slot during the virtual conference session.
Figure 12:
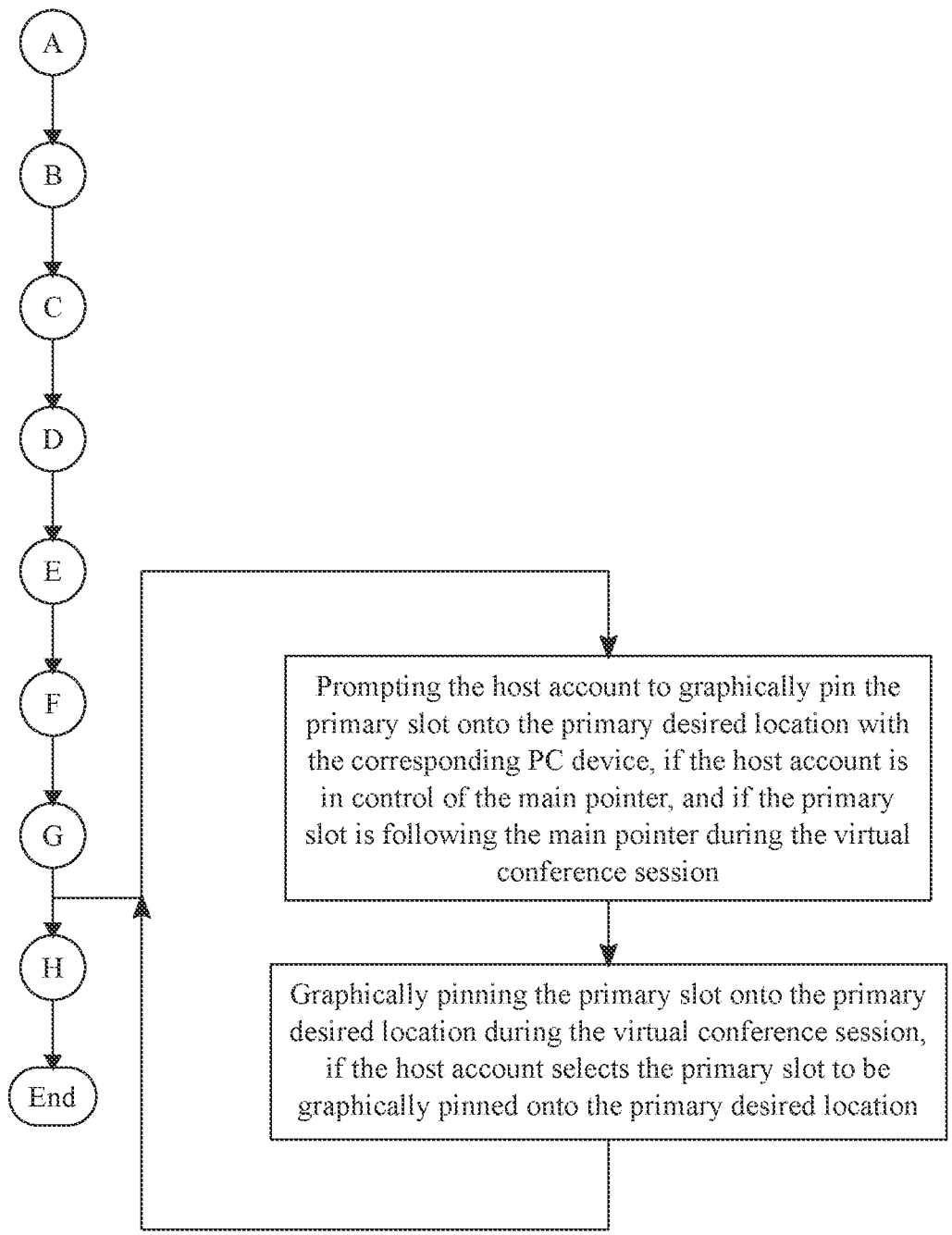
FIG. 12 is a flowchart depicting a subprocess of prompting the host account to graphically pin the primary slot onto a primary desired location and graphically pinning the primary slot to the primary desired location during the virtual conference session.

As can be seen in FIG. 11, a subprocess of the present invention comprises the steps of prompting the host account to graphically click on the primary slot with the corresponding PC device after Step H in order to switch the feed video of the host account into the primary slot. For example, if the host X wants to take over control of the virtual conference session back from participant Y, then the host X has to graphically click on the primary slot with the corresponding PC device of the host account. The subprocess continues by displaying the feed video of the host account within the primary slot and the feed video of the participant account within the secondary slot during the virtual conference session, if the primary slot is graphically clicked by the host account. In other words, based on the previous example, following clicking of the primary slot, the feed video from corresponding PC device of the host X is displayed in the primary slot and the feed video from the corresponding PC device of participant Y is displayed in the secondary slot.

It is an aim of the present invention to arrange host and participant videos on a desktop, tablet, or mobile display in such a way that important parts of the shared screen are made visible or are unobstructed. To that end, a subprocess of the present invention comprises the steps of prompting the host account to graphically pin the primary slot onto the primary desired location with the corresponding PC device, if the host account is in control of the main pointer, and if the primary slot is following the main pointer during the virtual conference session. In other words, the host X may move and pin the host X account's feed video to any location on the main screen, if the host is in control of the main pointer. Further, the sub-process continues by graphically pinning the primary slot onto the primary desired location during the virtual conference session, if the host account selects the primary slot to be graphically pinned onto the primary desired location. Thus, during any part of the virtual conference session, the pinned primary slot will remain stationary and does not obstruct any shared video content.

Figure 13:
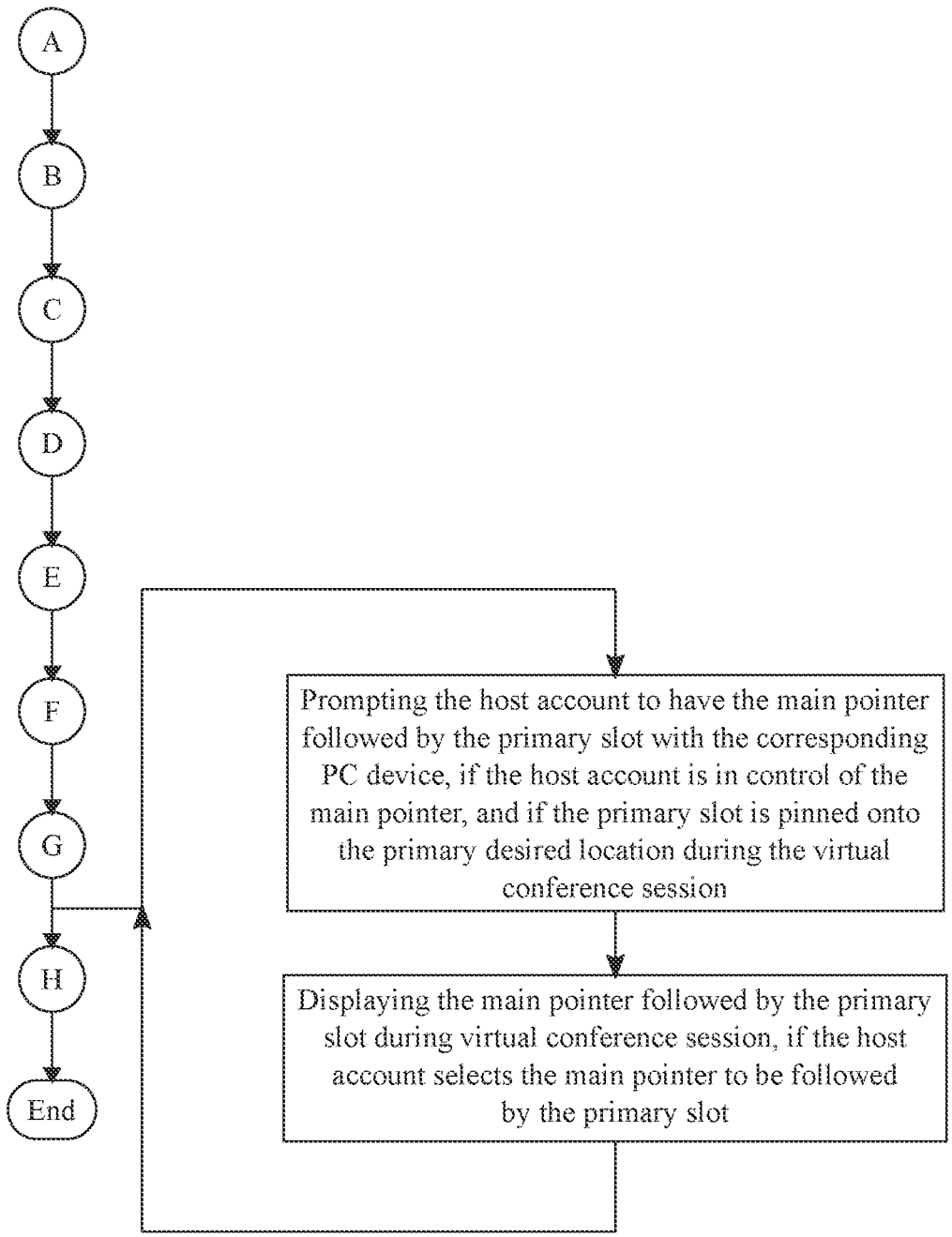
FIG. 13 is a flowchart depicting a subprocess of prompting the host account to have the main pointer followed by the primary slot and displaying the main pointer followed by the primary slot.

As can be seen in FIG. 13, a sub-process of the present invention comprises the steps of prompting the host account to have the main pointer followed by the primary slot with the corresponding PC device, if the host account is in control of the main pointer, and if the primary slot is pinned onto the primary desired location during the virtual conference session. That is, the main pointer will follow the primary slot if the host X chooses the main pointer to follow the primary slot, instead of being pinned in one location. Further, the subprocess continues by displaying the main pointer followed by the primary slot during virtual conference session if the host account selects the main pointer to be followed by the primary slot.

Figure 14:
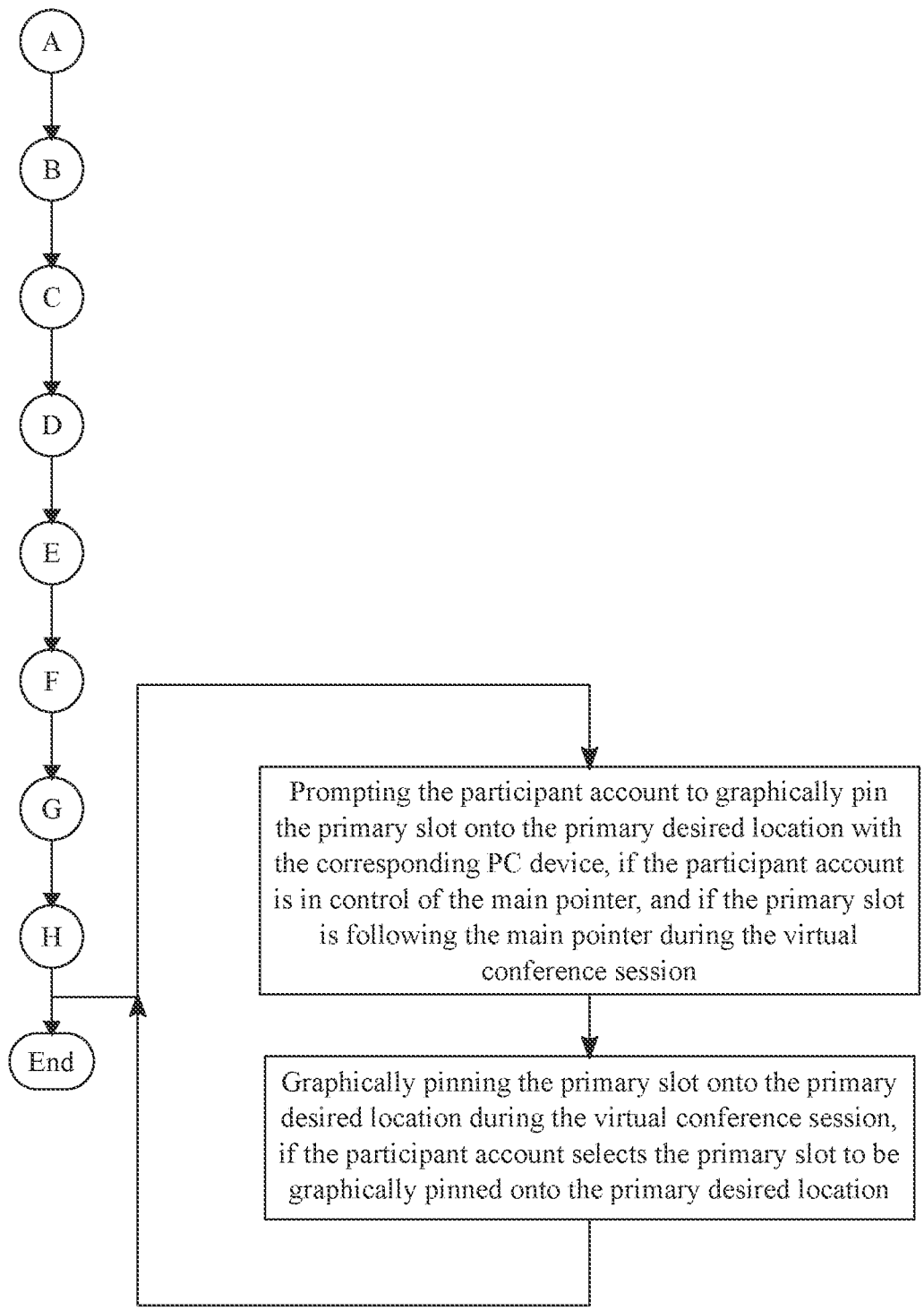
FIG. 14 is a flowchart depicting a subprocess of prompting the participant account to graphically pin the primary slot onto a primary desired location and graphically pinning the primary slot to the primary desired location during the virtual conference session.

As can be seen in FIG. 14, a sub-process of the present invention comprises the steps of prompting the participant account to graphically pin the primary slot onto the primary desired location with the corresponding PC device, if the participant account is in control of the main pointer, and if the primary slot is following the main pointer during the virtual conference session. For example, if participant Y wants to pin the primary slot onto any specific point on the main screen, the participant Y has the option to do that. Further, the subprocess continues by graphically pinning the primary slot onto the primary desired location during the virtual conference session, if the participant account selects the primary slot to be graphically pinned onto the primary desired location. This feature comes in handy if the primary slot is blocking the view of anything that is being presented or shared during the virtual conference session.

Figure 15:
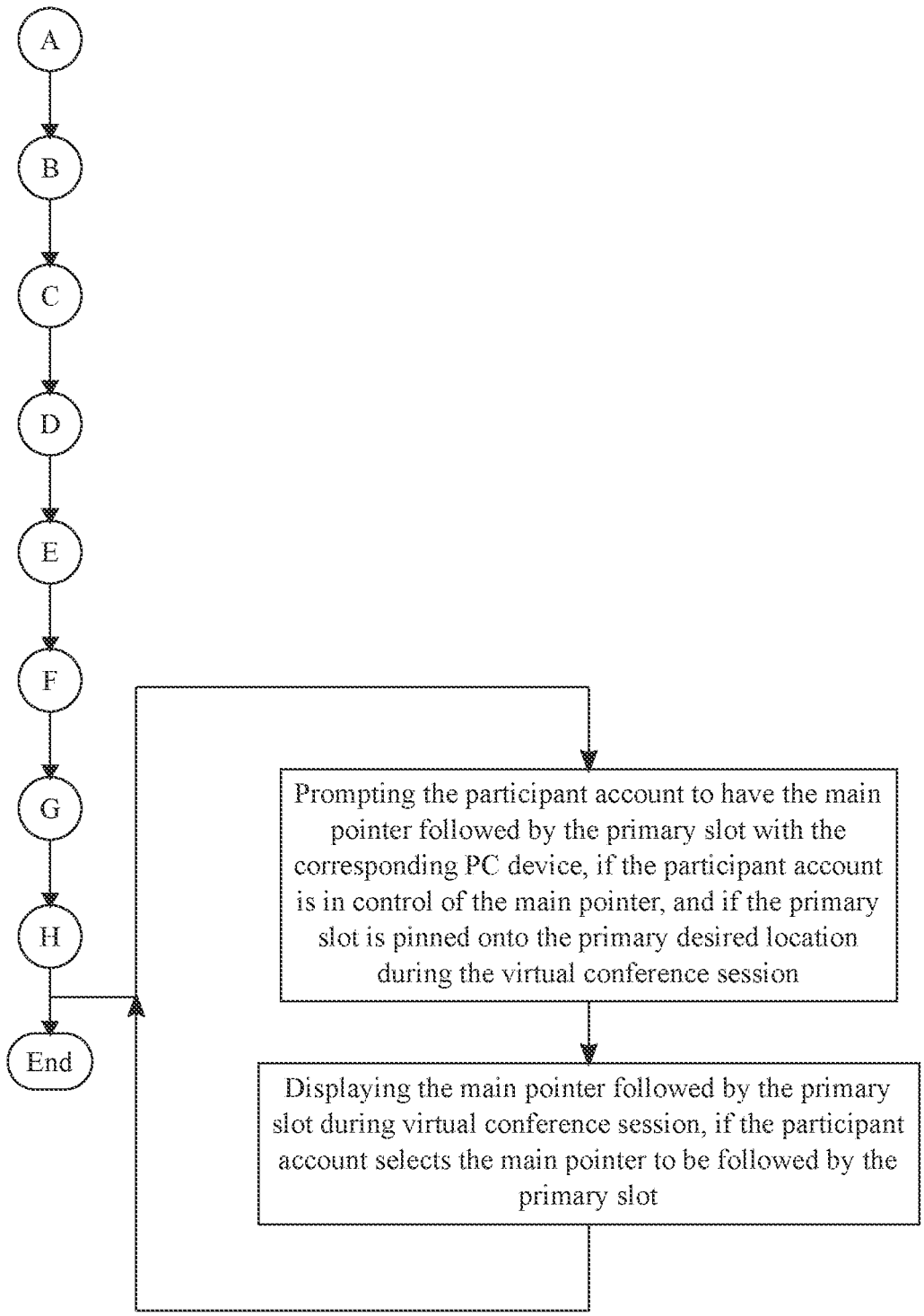
FIG. 15 is a flowchart depicting a subprocess of prompting the participant account to have the main pointer followed by the primary slot and displaying the main pointer followed by the primary slot.

As can be seen in FIG. 15, a sub-process of the present invention comprises the steps of prompting the participant account to have the main pointer followed by the primary slot with the corresponding PC device, if the participant account is in control of the main pointer, and if the primary slot is pinned onto the primary desired location during the virtual conference session. That is, the main pointer will follow the primary slot if participant Y chooses the main pointer to follow the primary slot, instead of being pinned in one location. The subprocess continues by displaying the main pointer followed by the primary slot during virtual conference session, if the participant account selects the main pointer to be followed by the primary slot.

Figure 16:
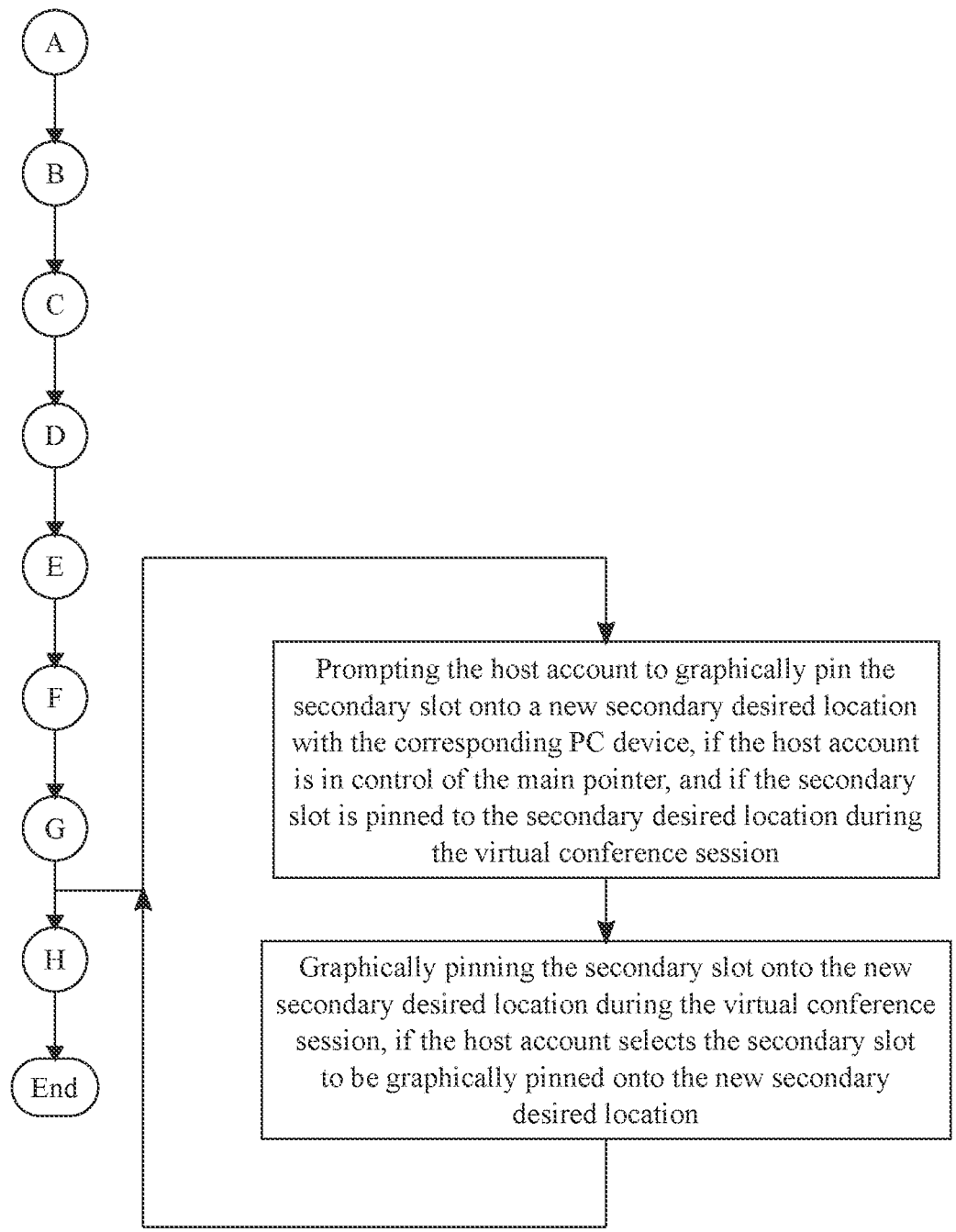
FIG. 16 is a flowchart depicting a subprocess of prompting the host account to graphically pin the secondary slot onto a new secondary desired location and graphically pinning the secondary slot to the new secondary desired location during the virtual conference session.

Similar to the ability of moving and pinning the primary slot to a desired location on the screen, the user in charge of the main pointer or primary slot. To that end, and as seen in FIG. 16, a subprocess of the method of present invention comprises the steps of prompting the host account to graphically pin the secondary slot onto a new secondary desired location with the corresponding PC device, if the host account is in control of the main pointer, and if the secondary slot is pinned to the secondary desired location during the virtual conference session. In other words, the user account who is in charge of the main pointer has the ability to move and pin the second slot on to a new secondary desired location if needed. The subprocess continues by graphically pinning the secondary slot onto the new secondary desired location during the virtual conference session, if the host account selects the secondary slot to be graphically pinned onto the new secondary desired location.

Figure 17:
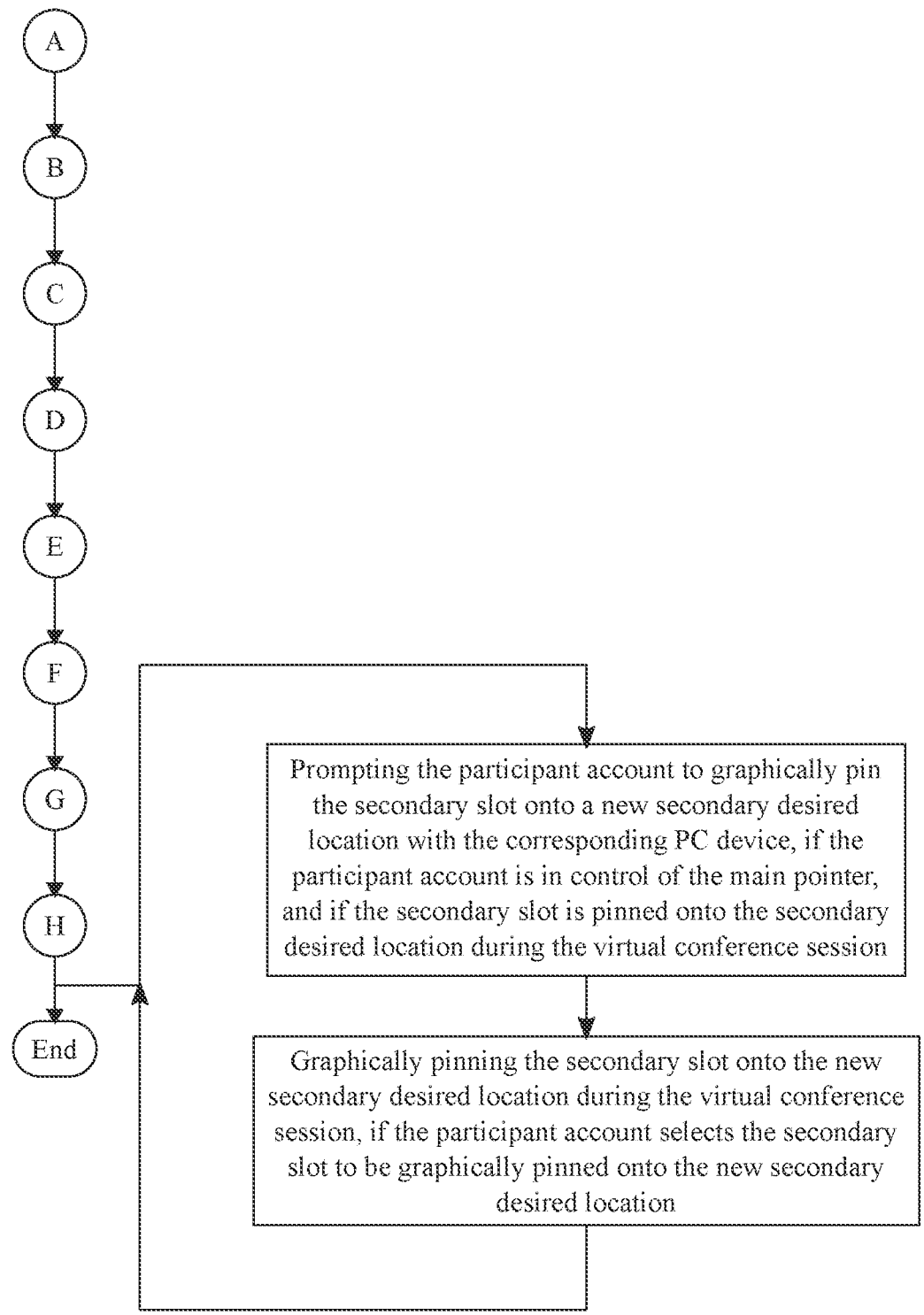
FIG. 17 is a flowchart depicting a subprocess of prompting the participant account to graphically pin the secondary slot onto a new secondary desired location and graphically pinning the secondary slot to the new secondary desired location during the virtual conference session.

As can be seen in FIG. 17, a sub-process of the present invention comprises prompting the participant account to graphically pin the secondary slot onto a new secondary desired location with the corresponding PC device, if the participant account is in control of the main pointer, and if the secondary slot is pinned onto the secondary desired location during the virtual conference session. In other words, the user account who is in charge of the main pointer, even if it is a participant or attendee, has the ability to move and pin the second slot on to a new secondary desired location if needed. The sub-process continues by graphically pinning the secondary slot onto the new secondary desired location during the virtual conference session, if the participant account selects the secondary slot to be graphically pinned onto the new secondary desired location.

Figure 18:
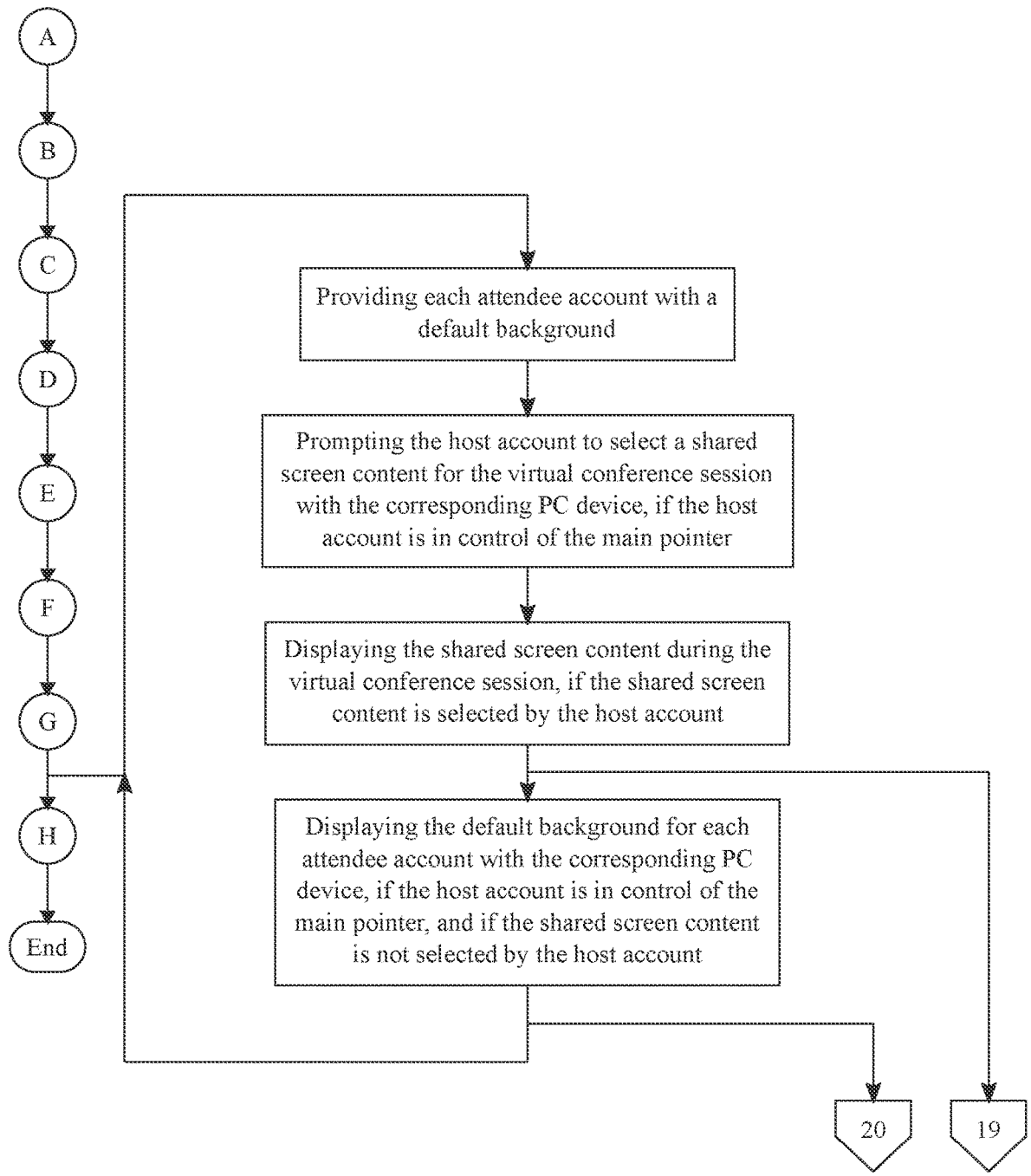
FIG. 18 is a flowchart depicting a subprocess of displaying shared screen content and default background by the host account during the virtual conference session.

As can be seen in FIG. 18, a subprocess of the present invention comprises the steps of providing each attendee account with a default background. A default background can be a still picture, a motion picture, a 3D (three dimensional) picture, a pattern, or a blank page that the corresponding PC of each attendee account is provided with. The subprocess continues by prompting the host account to select a shared screen content for the virtual conference session with the corresponding PC device, if the host account is in control of the main pointer. Shared screen content is a display material that the host account selects with the corresponding PC to be shared with the rest of the attendees. Examples of the shared screen content include, but are not limited to, a webpage, a presentation slide, a video, a picture, etc. The plurality of attendees may interact using a mouse follow mechanism, and/or audio interaction, and/or video interaction. To that end, the present invention enables the plurality of attendees to browse a website together while being on a phone call or in a separate video or audio conference call such as Slack, Huddle, or Zoom. To accomplish this, the host account must be in control of the main pointer and the feed video of the host account must be displayed in the primary slot. Accordingly, the subprocess continues by displaying the shared screen content during the virtual conference session, if the shared screen content is selected by the host account. In other words, once the host account is in control of the main pointer and is leading the virtual conference session, the host account selects and displays the shared screen content with the rest of the attendees during the virtual conference session.

Furthermore, the subprocess continues by displaying the default background for each attendee account with the corresponding PC device, if the host account is in control of the main pointer, and if the shared screen content is not selected by the host account. In other words, if the host account has not selected any shared screen content, the corresponding PC device of each of the attendees displays only the default background that was initially provided by their corresponding PC device. For example, if participant Y has a yellow flower as the default background, and host X selects a presentation ABC as the shared screen content, then the corresponding PC device of all the attendee accounts, including participant Y displays the presentation slide ABC as the background of the virtual conference session. If the host X has not selected any shared screen content, the corresponding PC device of participant Y displays the yellow flower as the background for the virtual conference session. The shared screen content is applicable on websites (for co-browsing), in collaborative applications such as Google Docs, and in Operating Systems for remote control operations. In all such cases, the participants are grouped together and can switch control to follow the mouse or tap movements of the primary slot.

Figure 20:
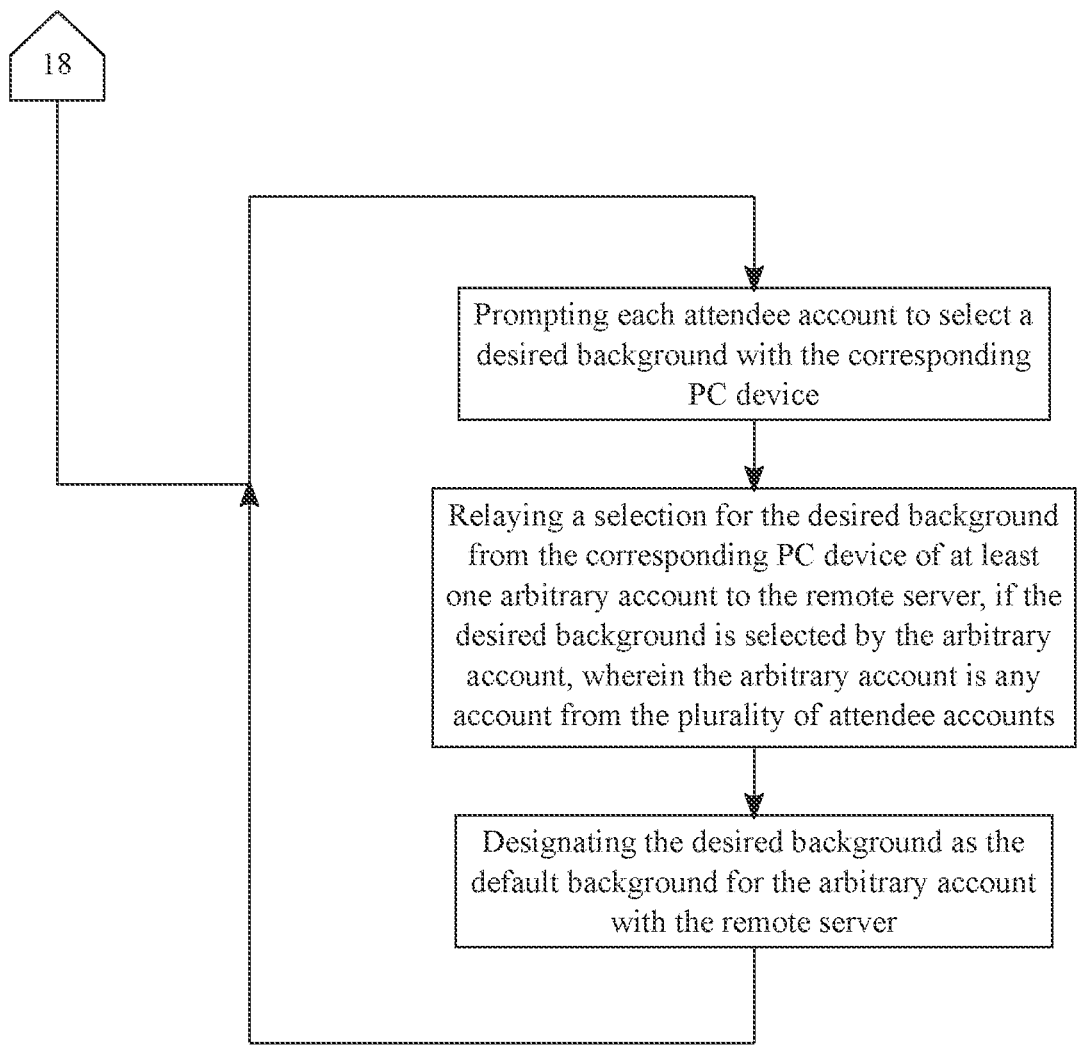
FIG. 20 is a flowchart depicting a subprocess of selecting and designating a desired background as the default background.

As can be seen in FIG. 20, a sub-process of the present invention comprises the steps of prompting each attendee account to select a desired background with the corresponding PC device. The desired background is a background for the virtual conference session that each attendee account can select with their corresponding PC device. Accordingly, the sub-process continues by relaying a selection for the desired background from the corresponding PC device of at least one arbitrary account to the remote server, if the desired background is selected by the arbitrary account, wherein the arbitrary account is any account from the plurality of attendee accounts. In other words, any user from the plurality of attendee accounts can select the desired background with the help of the remote server, and that selection is relayed to the corresponding PC device of that arbitrary account. For example, if an arbitrary account Z from the plurality of attendee accounts selects the photo of an elephant as the desired background, then desired background of the elephant's photograph is relayed only to the corresponding PC device of arbitrary account Z. Further, the sub-process continues by designating the desired background as the default background for the arbitrary account with the remote server. In other words, the above subprocess of the present invention allows each of the plurality of attendee accounts to select a background of their choice as the background for the virtual conference session regardless of what the default background of their corresponding PC is. For example, if participant Y has a yellow flower as the default background on the corresponding PC, and if participant Y chooses a red bird as the desired background, then the red bird is set as the default background on the corresponding PC of participant Y for the virtual conference session.

Figure 19:
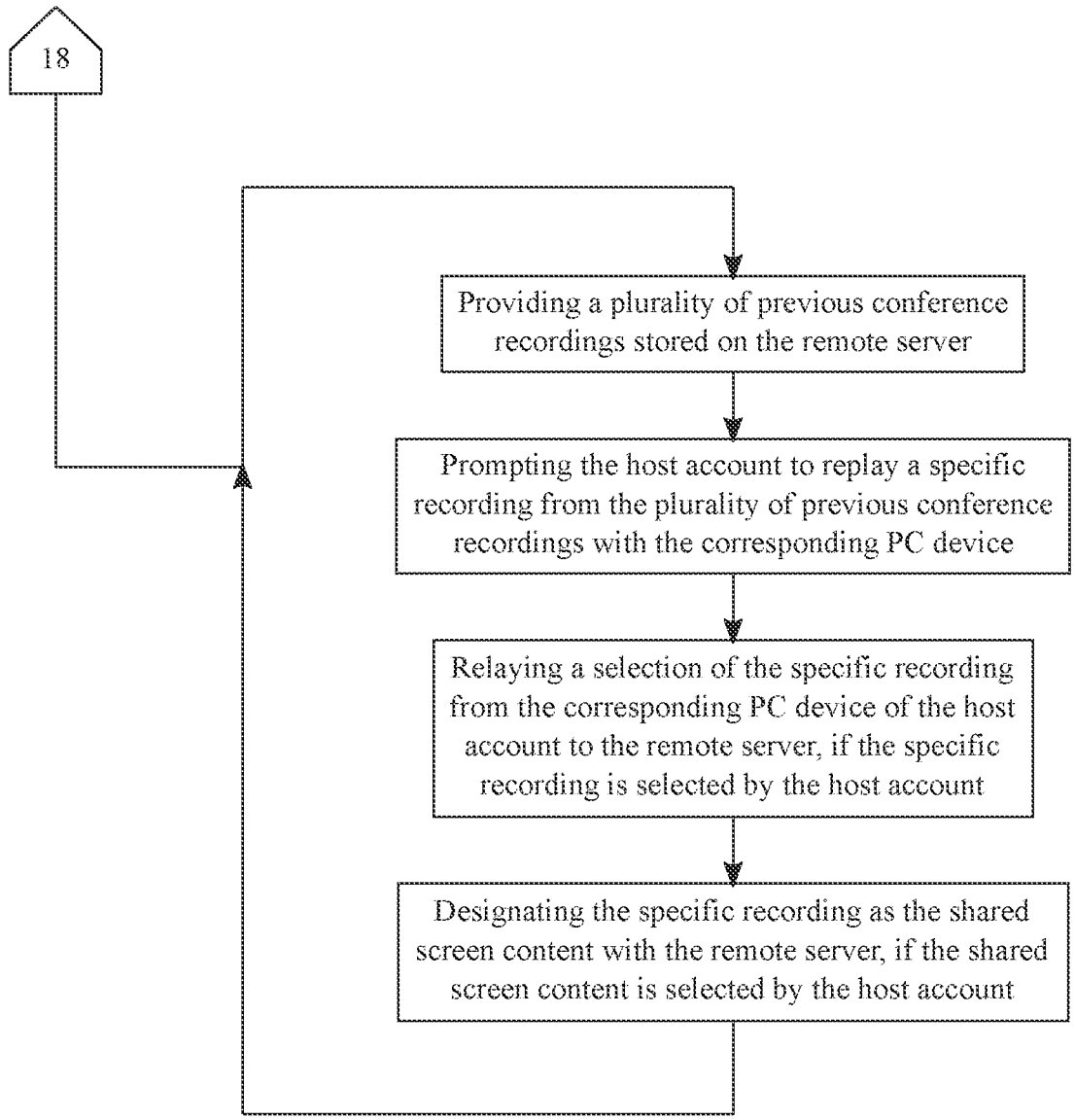
FIG. 19 is a flowchart depicting a subprocess of relaying a previous conference recording as a shared screen content by the host account.

In reference to FIG. 19, a subprocess of the present invention comprises the steps of providing a plurality of previous conference recordings stored on the remote server. In other words, the present invention enables access to previous conference recordings during the virtual conference session. Accordingly, the subprocess continues by prompting the host account to replay a specific recording from the plurality of previous conference recordings with the corresponding PC device. For example, the host account X may have a tab or button visible on the default background of the corresponding PC, from where the host account X can access the plurality of previous conference recordings and select a specific recording or any single recording by clicking a button or thumbnail associated with that specific recording. Further, the subprocess continues by relaying a selection of the specific recording from the corresponding PC device of the host account to the remote server, if the specific recording is selected by the host account. In other words, once the host account selects the specific recording from the plurality of previous conference recordings, that specific recording is relayed or transferred from the host account to the remote server, so that the specific recording may be streamed to the plurality of attendee accounts. To that end, the subprocess continues by designating the specific recording as the shared screen content with the remote server, if the shared screen content is selected by the host account. In other words, selection of the specific recording is followed by sharing of the specific recording as the shared screen content of the virtual conference session. This is so that the plurality of attendee accounts may be reminded of what happened in a previous video conference and subsequent action in reference to that previous video conference may be taken during the course of the current virtual conference session.

In an alternate embodiment, users can participate in asynchronous meetings. For example, according to this alternate embodiment, if User A records a session where User A is going through slides, a website, screen sharing, or any other collaborative space and sends the recording to User B. Subsequently, User B can view and reply. Further, after each session the other participating users receive a notification to view the added responses.

In another alternate embodiment, the virtual conference session may include a control button visible for each of the plurality of attendee accounts, wherein the control button enables to switch between the current view and a dispersed view (all participants move freely). In other words, the control button is an on/off switch or a group/ungroup button that enables to switch between views. More specifically, when the host account clicks on the control button for ungrouping, the plurality of feed videos moves freely along the default background. Similarly, if any of the participant account clicks the control button for grouping, the plurality of feed videos comes adjacent to one another in one of the proposed positions.

Figure 21:
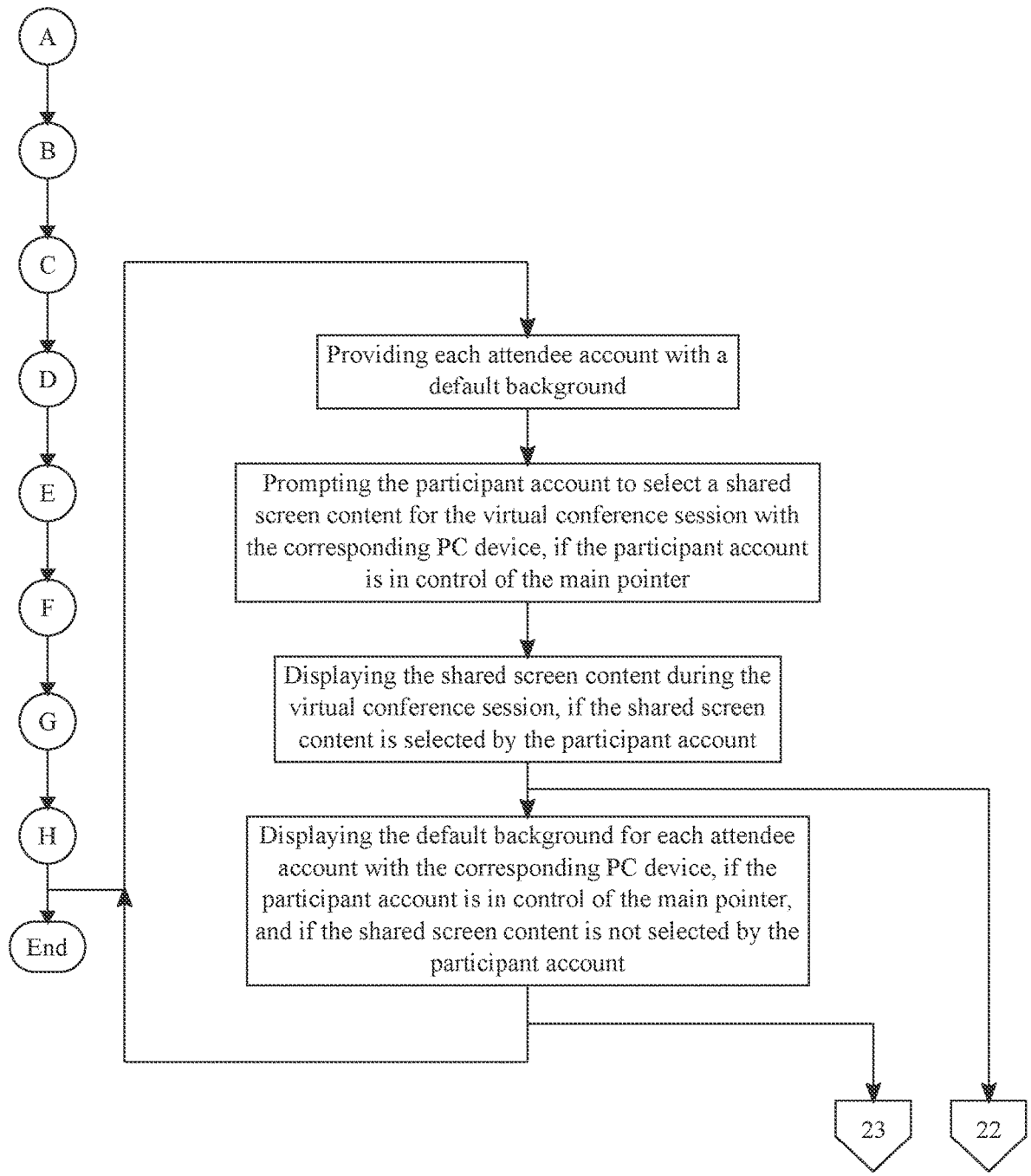
FIG. 21 is a flowchart depicting a subprocess of displaying shared screen content and default background by the participant account during the virtual conference session.

As can be seen in FIG. 21, a sub-process of the present invention comprises the steps of providing each attendee account with a default background. A default background can be a still picture, a motion picture, a 3D (three dimensional) picture, a pattern, or a blank page that the corresponding PC of each attendee account is provided with. The sub-process continues by prompting the participant account to select a shared screen content for the virtual conference session with the corresponding PC device, if the participant account is in control of the main pointer. Shared screen content is a display material that the participant account selects with the corresponding PC to be shared with the rest of the attendees. Examples of the shared screen content include, but are not limited to, a webpage, a presentation slide, a video, a picture, etc. To accomplish this, the participant account must be in control of the main pointer and the feed video of the participant account must be displayed in the primary slot. Accordingly, the sub-process continues by displaying the shared screen content during the virtual conference session, if the shared screen content is selected by the participant account. In other words, once the participant account is in control of the main pointer and is leading the virtual conference session, the participant account selects and displays the shared screen content with the rest of the attendees during the virtual conference session. Furthermore, the sub-process continues by displaying the default background for each attendee account with the corresponding PC device, if the participant account is in control of the main pointer, and if the shared screen content is not selected by the participant account. In other words, if the participant account has not selected any shared screen content, the corresponding PC device of each of the attendees displays only the default background that was initially provided by their corresponding PC device.

Figure 23:
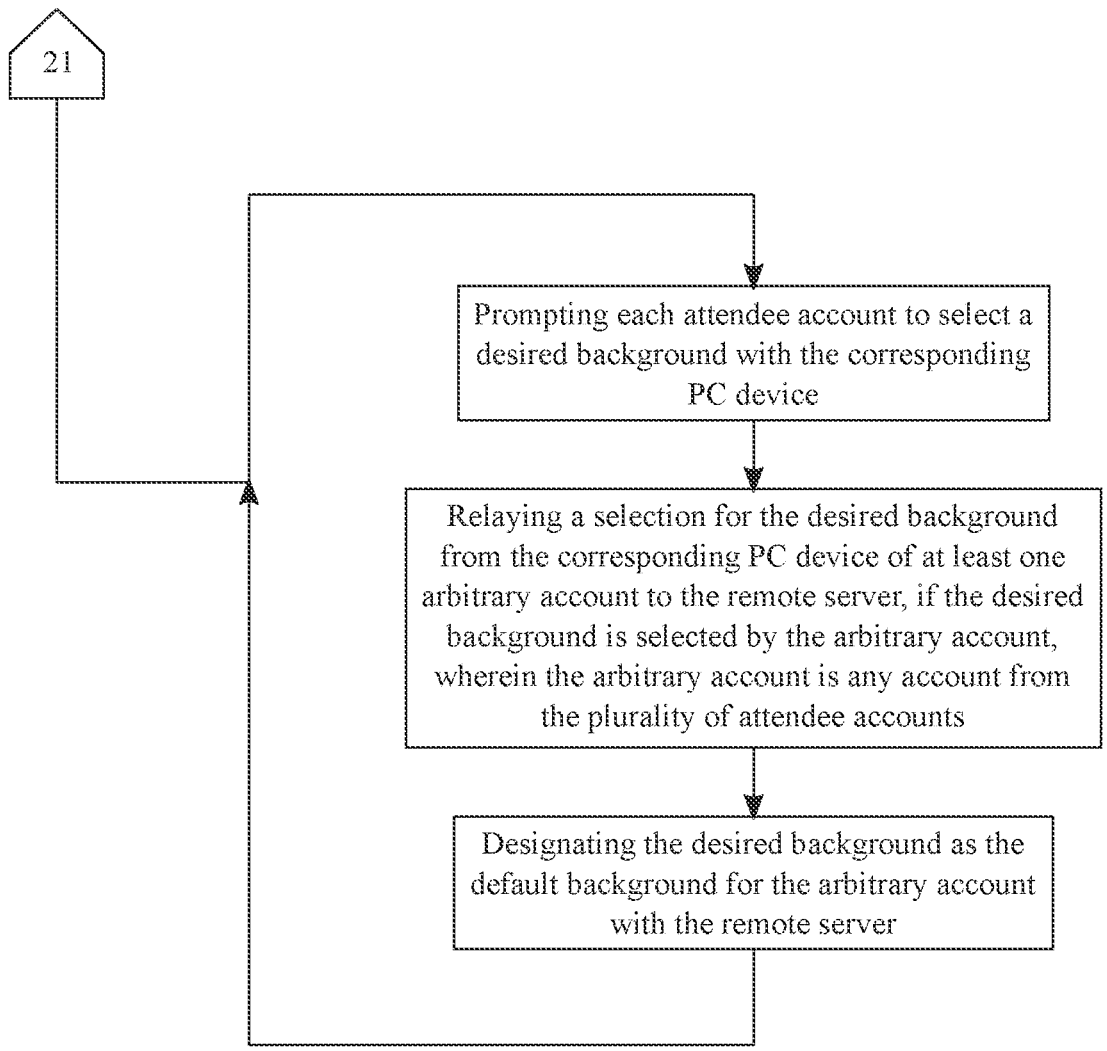
FIG. 23 is a flowchart depicting a subprocess of selecting and designating a desired background as the default background.

As can be seen in FIG. 23, a sub-process of the present invention comprises the steps of prompting each attendee account to select a desired background with the corresponding PC device. The desired background is a background for the virtual conference session that each attendee account can select with their corresponding PC device. Accordingly, the sub-process continues by relaying a selection for the desired background from the corresponding PC device of at least one arbitrary account to the remote server, if the desired background is selected by the arbitrary account, wherein the arbitrary account is any account from the plurality of attendee accounts. In other words, any user from the plurality of attendee accounts can select the desired background with the help of the remote server, and that selection is relayed to the corresponding PC device of that arbitrary account. For example, if an arbitrary account Z from the plurality of attendee accounts selects the photo of an elephant as the desired background, then desired background of the elephant's photograph is relayed only to the corresponding PC device of arbitrary account Z. Further, the sub-process continues by designating the desired background as the default background for the arbitrary account with the remote server. In other words, the above sub-process of the present invention allows each of the plurality of attendee accounts to select a background of their choice as the background for the virtual conference session regardless of what the default background of their corresponding PC is.

Figure 22:
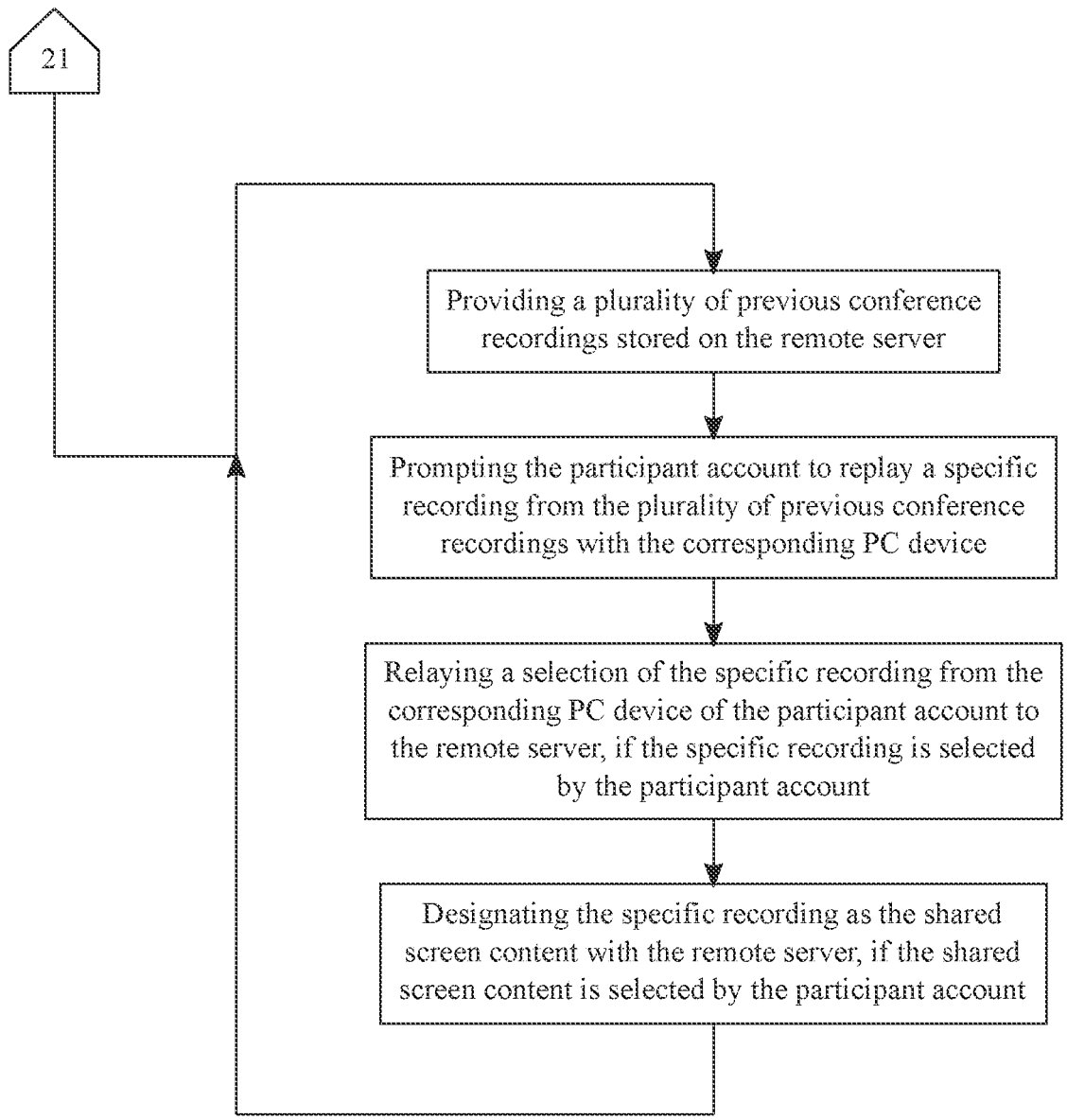
FIG. 22 is a flowchart depicting a subprocess of relaying a previous conference recording as a shared screen content by the participant account.

In reference to FIG. 22, a sub-process of the present invention comprises the steps of providing a plurality of previous conference recordings stored on the remote server. In other words, the present invention enables access to previous conference recordings during the virtual conference session. Accordingly, the sub-process continues by prompting the participant account to replay a specific recording from the plurality of previous conference recordings with the corresponding PC device. For example, the participant account X may have a tab or button visible on the default background of the corresponding PC, from where the participant account X can access the plurality of previous conference recordings and select a specific recording or any single recording by clicking a button or thumbnail associated with that specific recording. Further, the sub-process continues by relaying a selection of the specific recording from the corresponding PC device of the participant account to the remote server, if the specific recording is selected by the host account. In other words, once the participant account selects the specific recording from the plurality of previous conference recordings, that specific recording is relayed or transferred from the participant account to the remote server, so that the specific recording may be streamed to the plurality of attendee accounts. To that end, the sub-process continues by designating the specific recording as the shared screen content with the remote server, if the shared screen content is selected by the participant account. In other words, selection of the specific recording is followed by sharing of the specific recording as the shared screen content of the virtual conference session. This is so that the plurality of attendee accounts may be reminded of what happened in a previous video conference and subsequent action in reference to that previous video conference may be taken during the course of the current virtual conference session.

Figure 24:
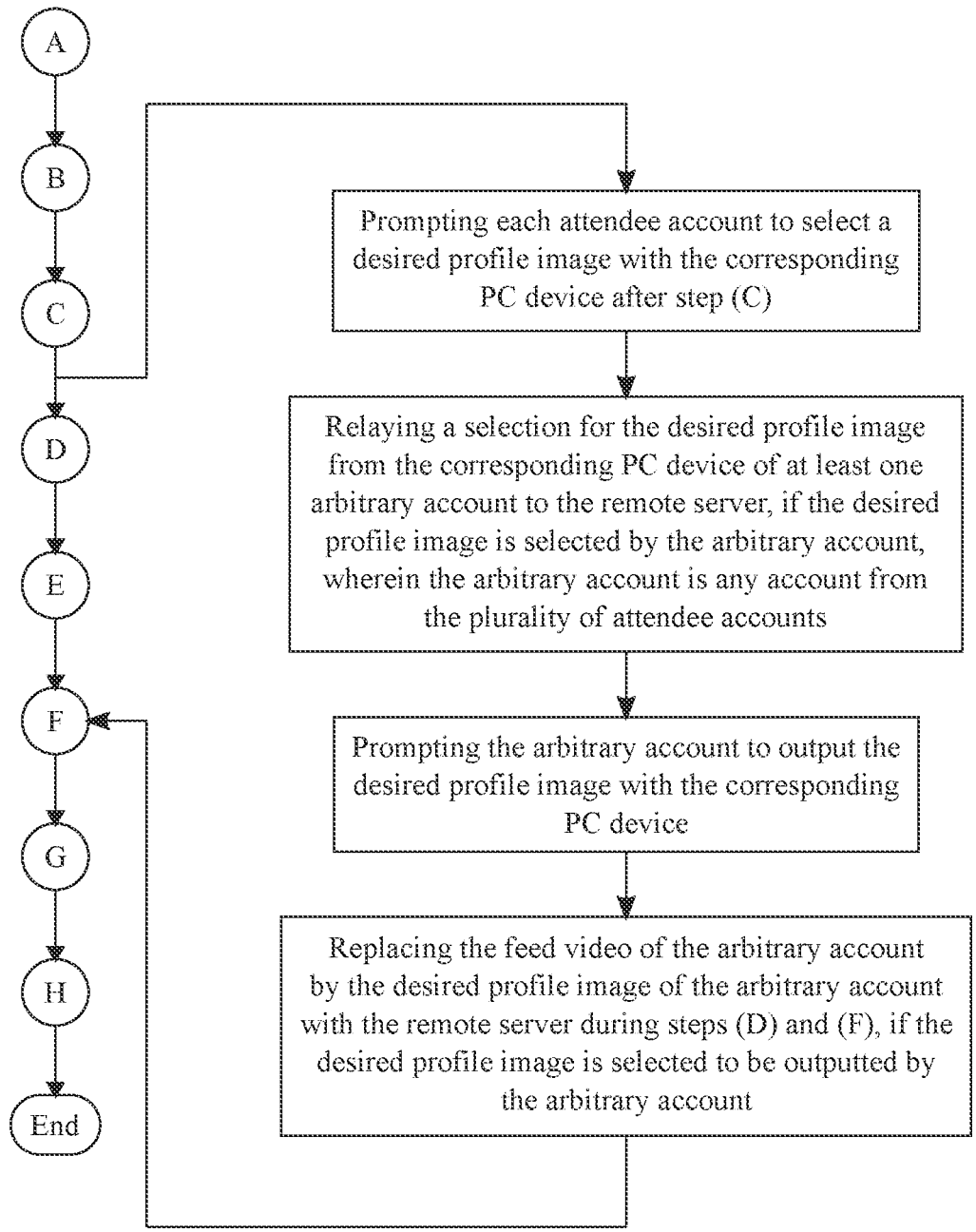
FIG. 24 is a flowchart depicting a subprocess of replacing the feed video with a desired profile image.

As can be seen in FIG. 24, a sub-process of the present invention comprises prompting each attendee account to select a desired profile image with the corresponding PC device after Step C. A desired profile image may be a photograph, a picture with initials or full name of the user or any other random still/motion picture that each attendee decides to display as their feed video during the virtual conference session. Accordingly, the sub-process continues by relaying a selection for the desired profile image from the corresponding PC device of at least one arbitrary account to the remote server, if the desired profile image is selected by the arbitrary account, wherein the arbitrary account is any account from the plurality of attendee accounts. For example, if the arbitrary account holder A decides to select a picture of an apple from the corresponding PC device of account holder A and selects that picture, then that picture of the apple is selected as the desired profile image of arbitrary account holder A. Further, the sub-process continues by replacing the feed video of the arbitrary account by the desired profile image of the arbitrary account with the remote server during Step D and Step F, if the desired profile image is selected to be outputted by the arbitrary account. In other words, once the desired profile image is selected, then that profile image is displayed as the feed video of arbitrary account holder A during the virtual conference session.

Figure 25:
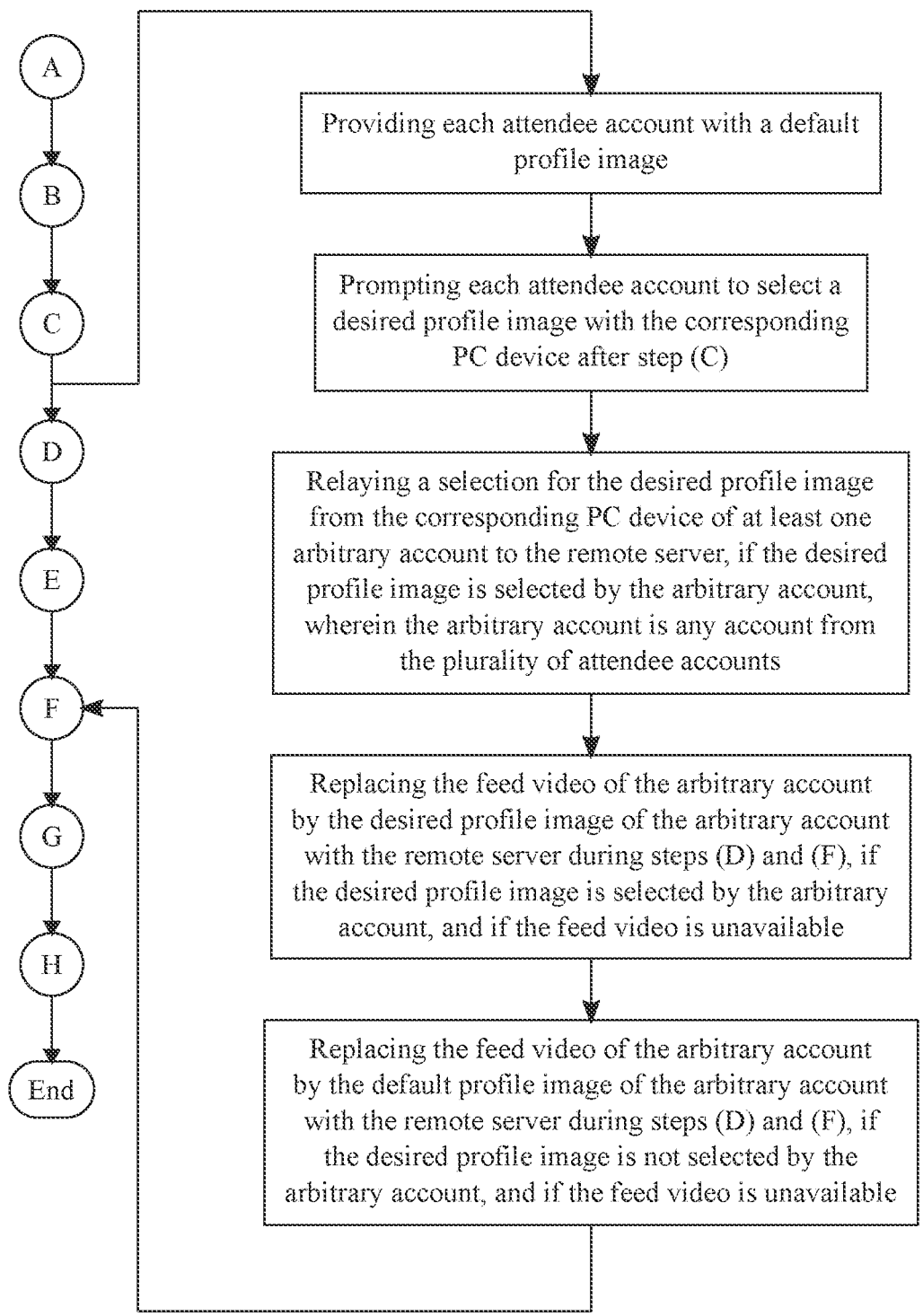
FIG. 25 is a flowchart depicting a subprocess of replacing the feed video with a default profile image.

In reference to FIG. 25, a sub-process of the present invention comprises providing each attendee account with a default profile image. A default profile image may be a photograph of the user, a picture of the initials of the user's name, or full name of the user that is stored as the default image for the user's account during account registration of the user account or simple initials of the user's name, that is automatically selected by the corresponding PC device. For example, if the user's name is Isaac Thomas, the default profile image of that user's account may be 'IT'. Further, the sub-process continues by prompting each attendee account to select a desired profile image with the corresponding PC device after Step C. As previously described, the desired profile image may be a photograph, a picture with initials or full name of the user, or any other random still/motion picture that each attendee decides to display as their feed video during the virtual conference session. Furthermore, the subprocess continues by relaying a selection for the desired profile image from the corresponding PC device of at least one arbitrary account to the remote server, if the desired profile image is selected by the arbitrary account, wherein the arbitrary account is any account from the plurality of attendee accounts. In other words, the selected profile image of the arbitrary account holder is relayed to the remote server. The subprocess further continues by replacing the feed video of the arbitrary account by the desired profile image of the arbitrary account with the remote server during Steps D and F, if the desired profile image is selected by the arbitrary account, and if the feed video is unavailable. However, in an alternate event, where the arbitrary account holder did not select a desired profile image, then the feed video displayed is the default profile image. More specifically, the subprocess continues by replacing the feed video of the arbitrary account by the default profile image of the arbitrary account with the remote server during Steps D and F, if the desired profile image is not selected by the arbitrary account, and if the feed video is unavailable. For example, if the name of the arbitrary account holder is Thomas Edison, and he did not select a desired profile image and he did not turn on the camera of this corresponding PC device, then during the virtual conference session, the initials 'TE' is displayed as the feed video of the arbitrary account holder.

Figure 26:
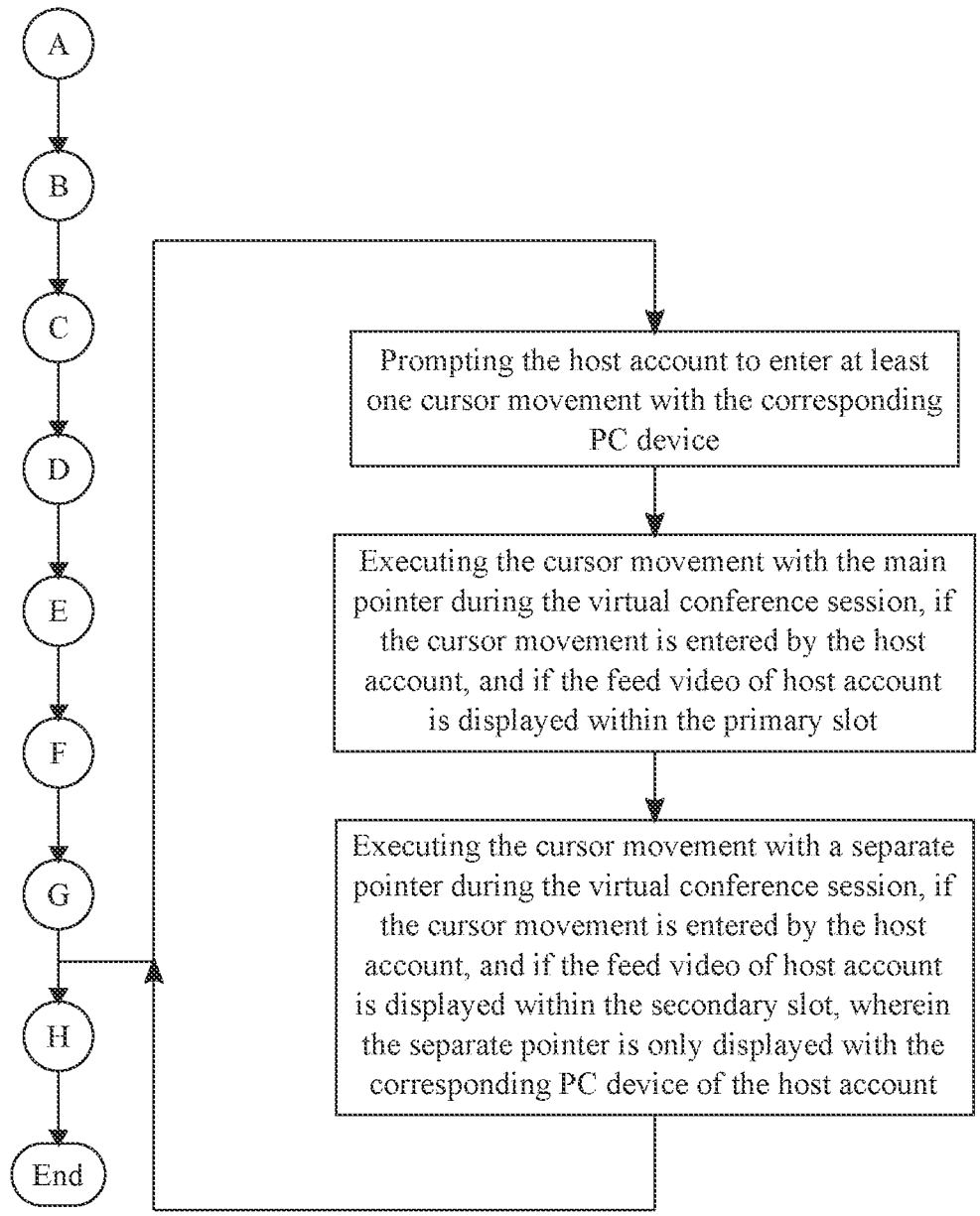
FIG. 26 is a flowchart depicting a subprocess of executing cursor movement by the host account.

Continuing with the preferred embodiment and as seen in FIG. 26, a sub-process of the present invention comprises the steps of prompting the host account to enter at least one cursor movement with the corresponding PC device. The at least one cursor movement relates to movement of an arrow cursor on the default background of the corresponding PC of the host account, that is actuated by movement of a mouse, movement of a finger over a touchpad, movement of a stylus or a surface pen over a screen of the corresponding PC device, etc. The sub-process continues by executing the cursor movement with the main pointer during the virtual conference session, if the cursor movement is entered by the host account, and if the feed video of host account is displayed within the primary slot. In other words, if the cursor movement is entered by the host account who is also leading the virtual conference session, the cursor moves with the main pointer during the virtual conference session. More specifically, as the arrow cursor on the corresponding PC device of the host account moves, the main pointer follows the cursor movement on the corresponding PC device of the host account, for movements such as scroll follow, clicking to the next html page, etc. Alternately, the sub-process continues by executing the cursor movement with a separate pointer during the virtual conference session, if the cursor movement is entered by the host account, and if the feed video of host account is displayed within the secondary slot, wherein the separate pointer is only displayed with the corresponding PC device of the host account. In other words, if the host account is not leading the virtual conference session and the feed video of the host account is displayed within the secondary slot, then the cursor movement does not follow the main pointer. In this case, the cursor movement is displayed as the movement of a separate pointer. Here the separate pointer is free, can move independently of the main pointer, and is displayed only on the corresponding PC device of the host account. This feature is beneficial as the separate pointer can freely move and click on the primary slot, if there is a need for the host account in the secondary slot to take back control or lead the virtual conference session. In the preferred embodiment, the cursor and the separate pointer are arrows. However, the cursor can take any other shape such as a hand shape, a finger shape, an alphabet shape, etc.

In an alternate embodiment, the cursor movement and the main pointer are separate. More specifically, in this embodiment, when the cursor moves to a new position, then the main pointer follows with a slight delay. This is so that the host account is able to click on participant videos and switch control during the virtual conference session.

Figure 27:
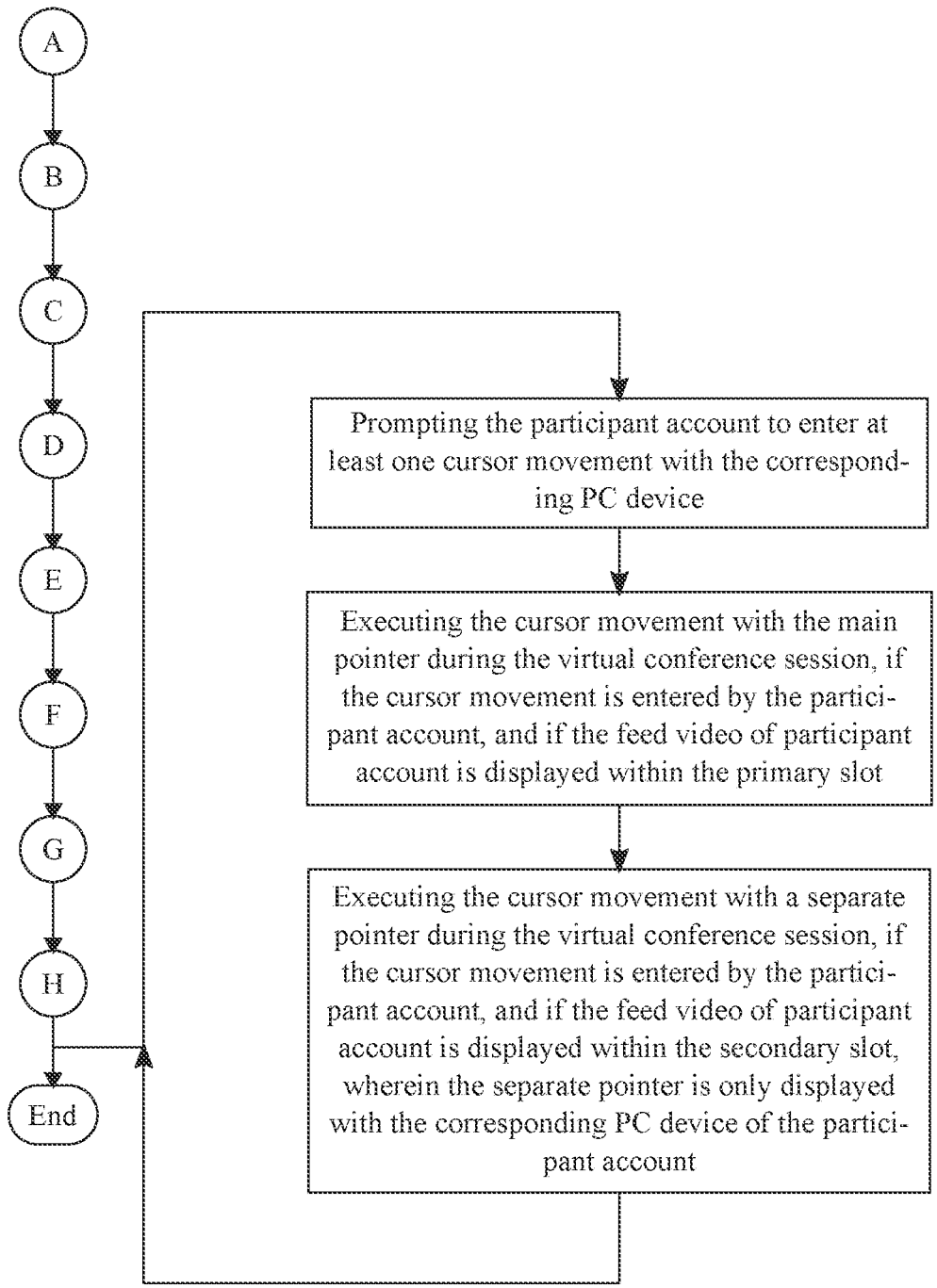
FIG. 27 is a flowchart depicting a subprocess of executing cursor movement by the participant account.

As seen in FIG. 27, a sub-process of the present invention comprises the steps of prompting the participant account to enter at least one cursor movement with the corresponding PC device. The at least one cursor movement relates to movement of an arrow cursor on the default background of the corresponding PC of the participant account, that is actuated by movement of a mouse, movement of a finger over a laptop touchpad, movement of a stylus or a surface pen over a screen of the corresponding PC device etc. The sub-process continues by executing the cursor movement with the main pointer during the virtual conference session, if the cursor movement is entered by the participant account, and if the feed video of participant account is displayed within the primary slot. In other words, if the cursor movement is entered by the participant account who is also leading the virtual conference session, the cursor moves with the main pointer during the virtual conference session. More specifically, as the arrow cursor on the corresponding PC device of the participant account moves, the main pointer follows the cursor movement on the corresponding PC device of the participant account, for movements such as scroll follow, clicking to the next html page, etc. Alternately, the sub-process continues by executing the cursor movement with a separate pointer during the virtual conference session, if the cursor movement is entered by the participant account, and if the feed video of participant account is displayed within the secondary slot, wherein the separate pointer is only displayed with the corresponding PC device of the participant account. In other words, if the participant account is not leading the virtual conference session and the feed video of the participant account is displayed within the secondary slot, then the cursor movement does not follow the main pointer. In this case, the cursor movement is displayed as the movement of a separate pointer. Here the separate pointer is free, can move independently of the main pointer, and is displayed only on the corresponding PC device of the participant account. This feature is beneficial as the separate pointer can freely move and click on the primary slot, if there is a need for the participant account in the secondary slot to take back control or lead the virtual conference session.

In the preferred embodiment, the primary slot and the secondary slot are circles or bubble shaped. However, the primary slot and the secondary slot may comprise any other shape, size, orientation, location, etc., as long as the intents of the present invention are not hindered. Furthermore, a graphical size of the primary slot is larger than a graphical size of the secondary slot. This is so that these contrastable graphical spaces enable easier identification of the feed video of the host account that is leading the virtual conference session from the rest of the feed video of the plurality of attendees, within the main pointer.

In an alternate embodiment, a graphical size of the primary slot is equal to a graphical size of the secondary slot.

Figure 28:
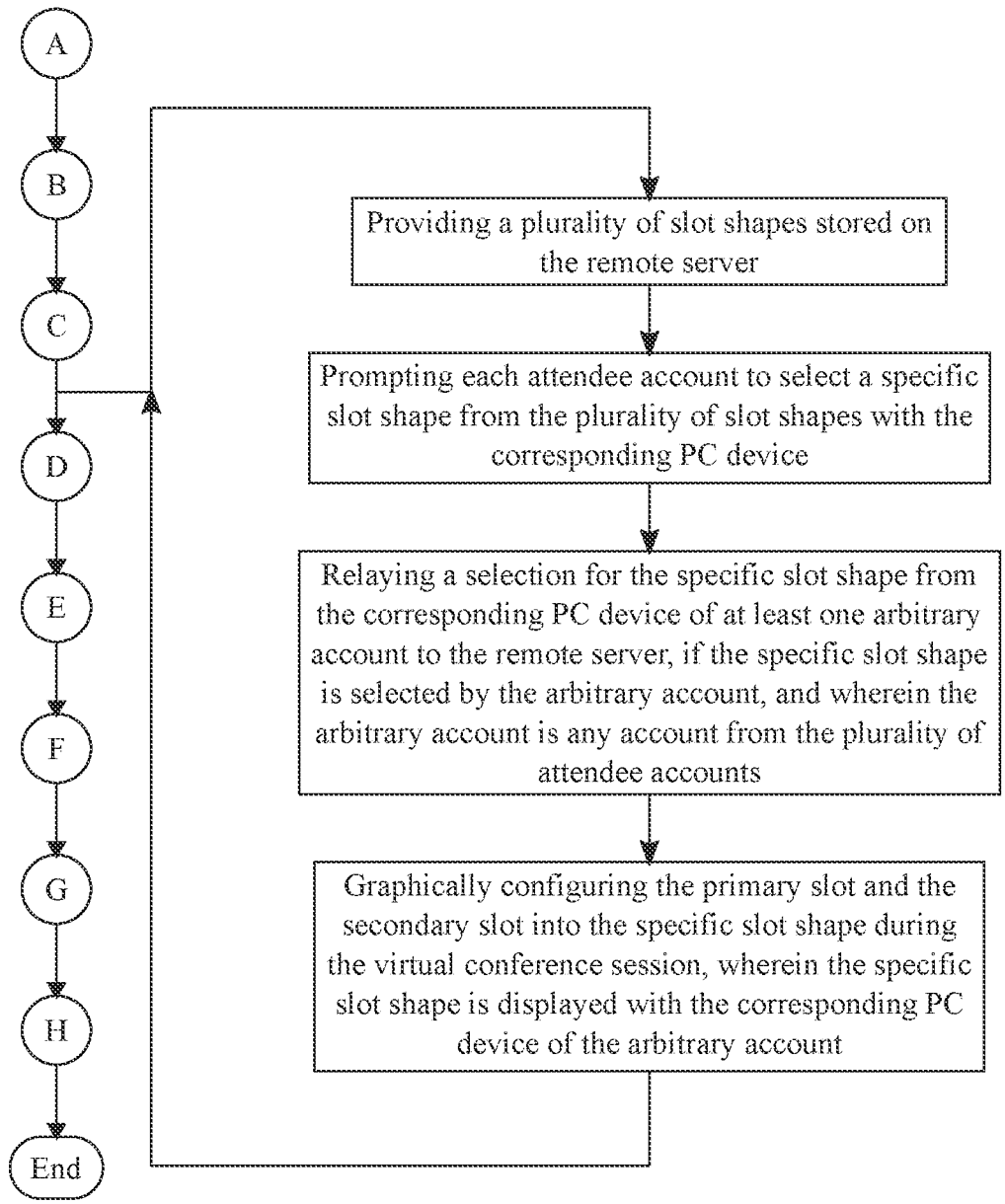
FIG. 28 is a flowchart depicting a subprocess of selecting and relaying a specific slot shape for the primary slot and the secondary slot.

In reference to FIG. 28, a sub-process of the present invention comprises the steps of providing a plurality of slot shapes stored on the remote server. The plurality of slot shapes refers to shapes in which the feed video of the plurality of attendees are displayed. Examples of slot shapes include, but are not limited to, circles, triangles, rectangles, human head shape, etc. Further, the sub-process continues by prompting each attendee account to select a specific slot shape from the plurality of slot shapes with the corresponding PC device. In other words, each attendee can select a specific shape of their choice from the plurality of slot shapes. The sub-process continues by relaying a selection for the specific slot shape from the corresponding PC device of at least one arbitrary account to the remote server, if the specific slot shape is selected by the arbitrary account, and wherein the arbitrary account is any account from the plurality of attendee accounts. In other words, if a slot shape selection is made by any arbitrary account from the plurality of attendee accounts, that slot shape is relayed to the remote server. Furthermore, the sub-process continues by graphically configuring the primary slot and the secondary slot into the specific slot shape during the virtual conference session, wherein the specific slot shape is displayed with the corresponding PC device of the arbitrary account. For example, if the arbitrary account selected a triangular shape as the specific slot shape, the primary slot and the secondary slot are graphically configured into triangular shapes, and that triangular slot shape is displayed with the corresponding PC device of the arbitrary account.

Figure 2:
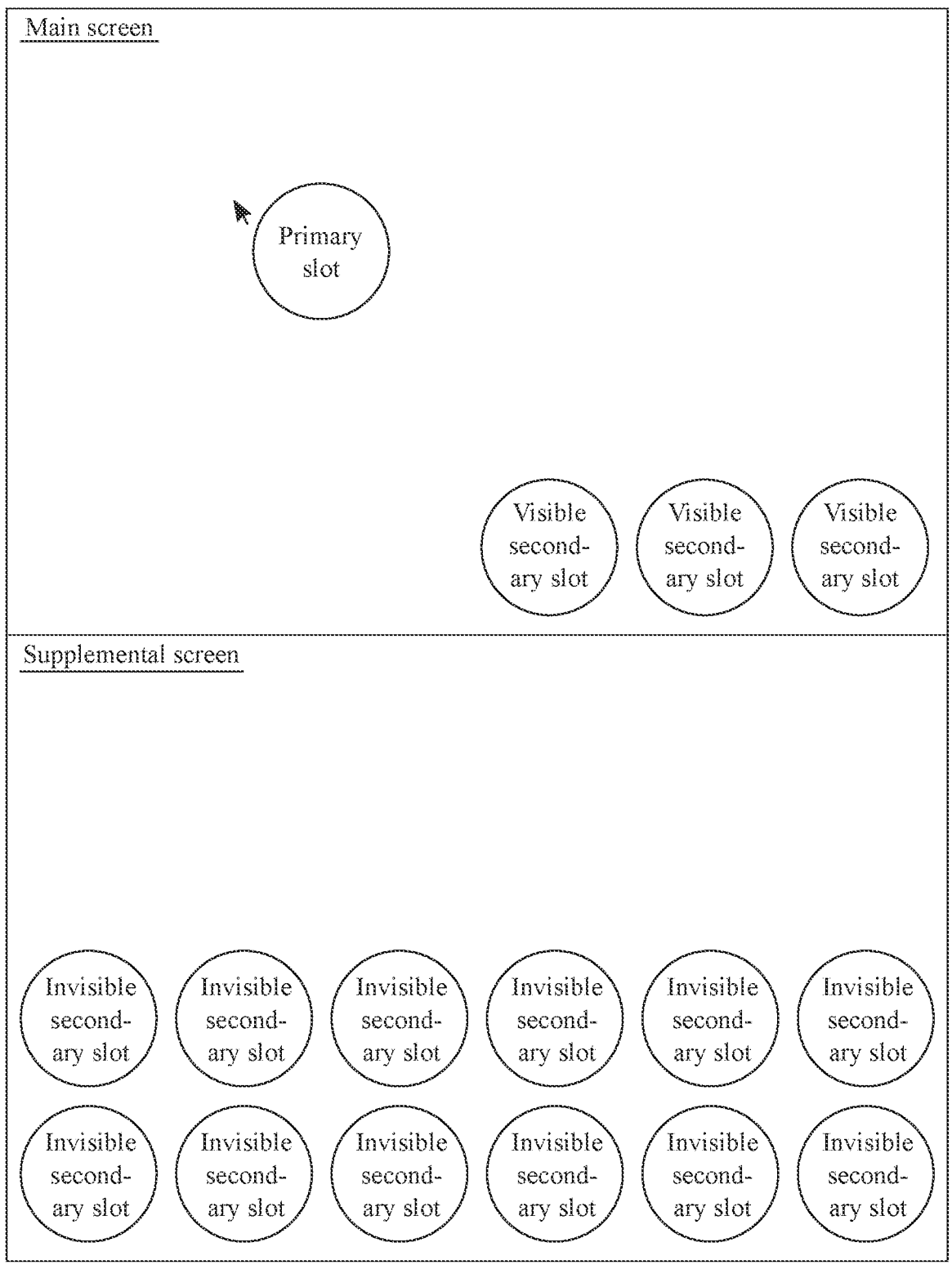
FIG. 2 is a schematic view of the present invention, showing a main screen and a supplemental screen, and an arrangement of a primary slot, a plurality of visible secondary slots and a plurality of invisible secondary slots.
Figure 3:
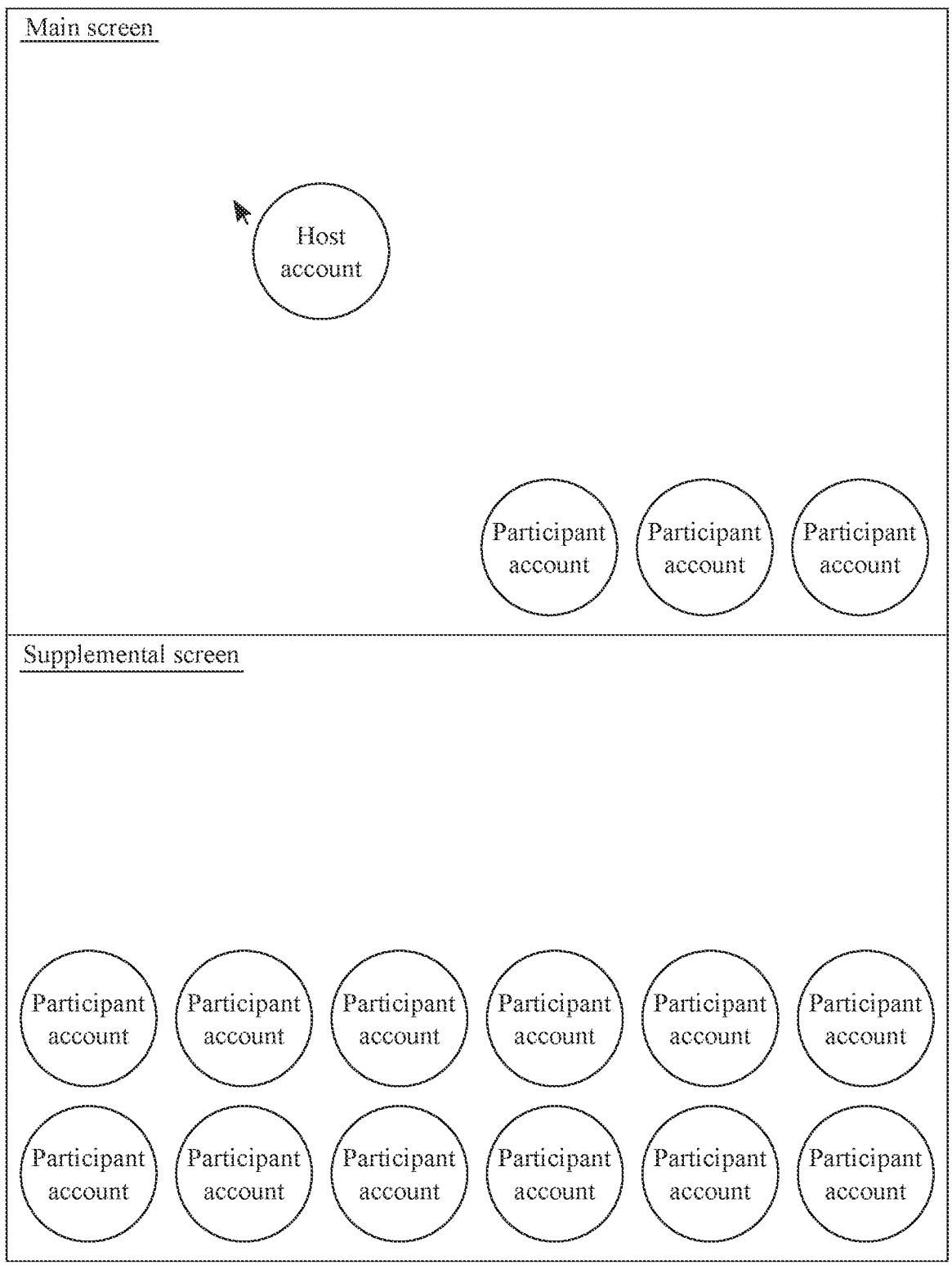
FIG. 3 is a schematic view of the present invention, that shows the main screen and the supplemental screen, and arrangement of the host account and plurality of participant accounts.
Figure 4:
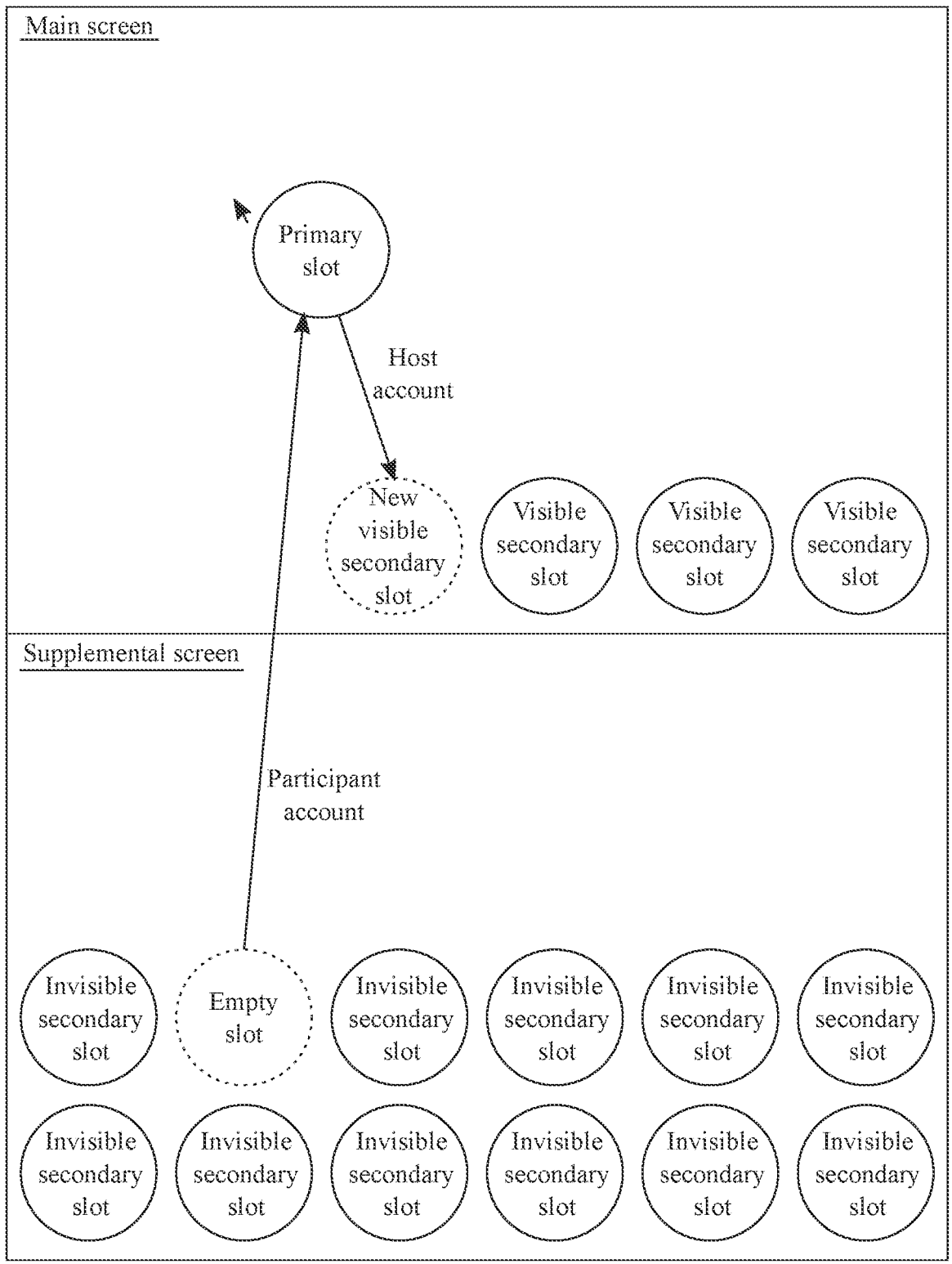
FIG. 4 is a schematic view of a first step of a sub-process of the present invention, that shows generation of new visible secondary slot for the host account, when a specific participant from the plurality of invisible secondary slots moves to the primary slot.
Figure 29:
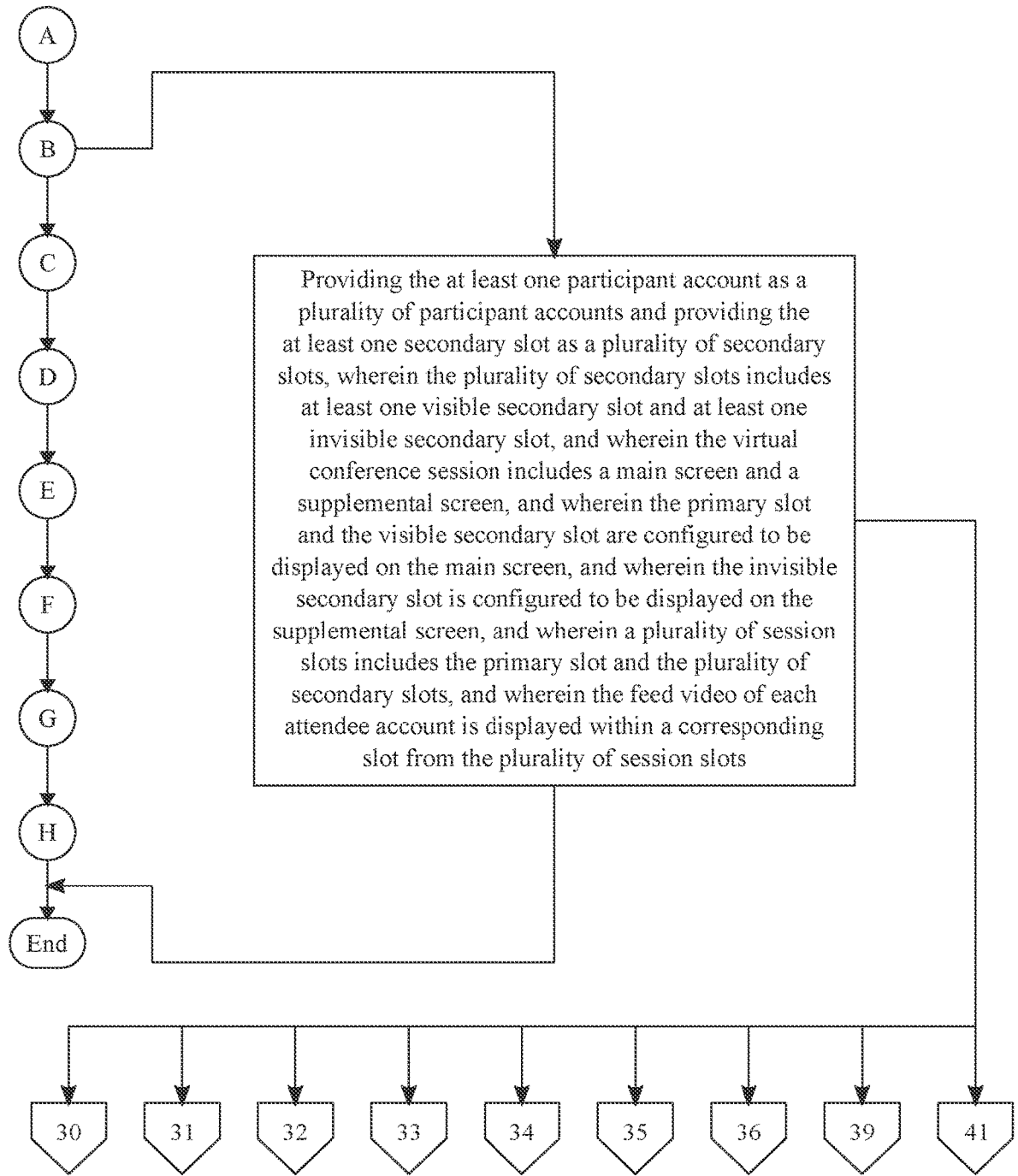
FIG. 29 is a flowchart depicting a subprocess of providing a plurality of participant accounts, a plurality of visible secondary slots, a plurality of invisible secondary slots, a main screen, and a supplemental screen.

In the preferred embodiment, the at least one participant account is a plurality of participant accounts, and the at least one secondary slot is a plurality of secondary slots, wherein the plurality of secondary slots includes at least one visible secondary slot and at least one invisible secondary slot. As seen in FIG. 29, the virtual conference session includes a main screen and a supplemental screen, wherein the primary slot and the visible secondary slot are configured to be displayed on the main screen, and wherein the invisible secondary slot is configured to be displayed on the supplemental screen. More specifically, and as seen in FIG. 2, the plurality of secondary slots are divided into two categories or sets. A first set of secondary slots or the at least one visible secondary slot that is visible in the main screen of the conference session and the second set of secondary slots arranged or displaced in a supplemental screen or separate screen. In other words, the visible secondary slots constitute the first row of participants seen at the bottom of the main page and the invisible secondary slots constitute the audience in a separate audience page. Furthermore, a plurality of session slots includes the primary slot and the plurality of secondary slots, wherein the feed video of each attendee account is displayed within a corresponding slot from the plurality of session slots. In other words, the feed video of the host and the participants together constitute the plurality of session slots.

Figure 30:
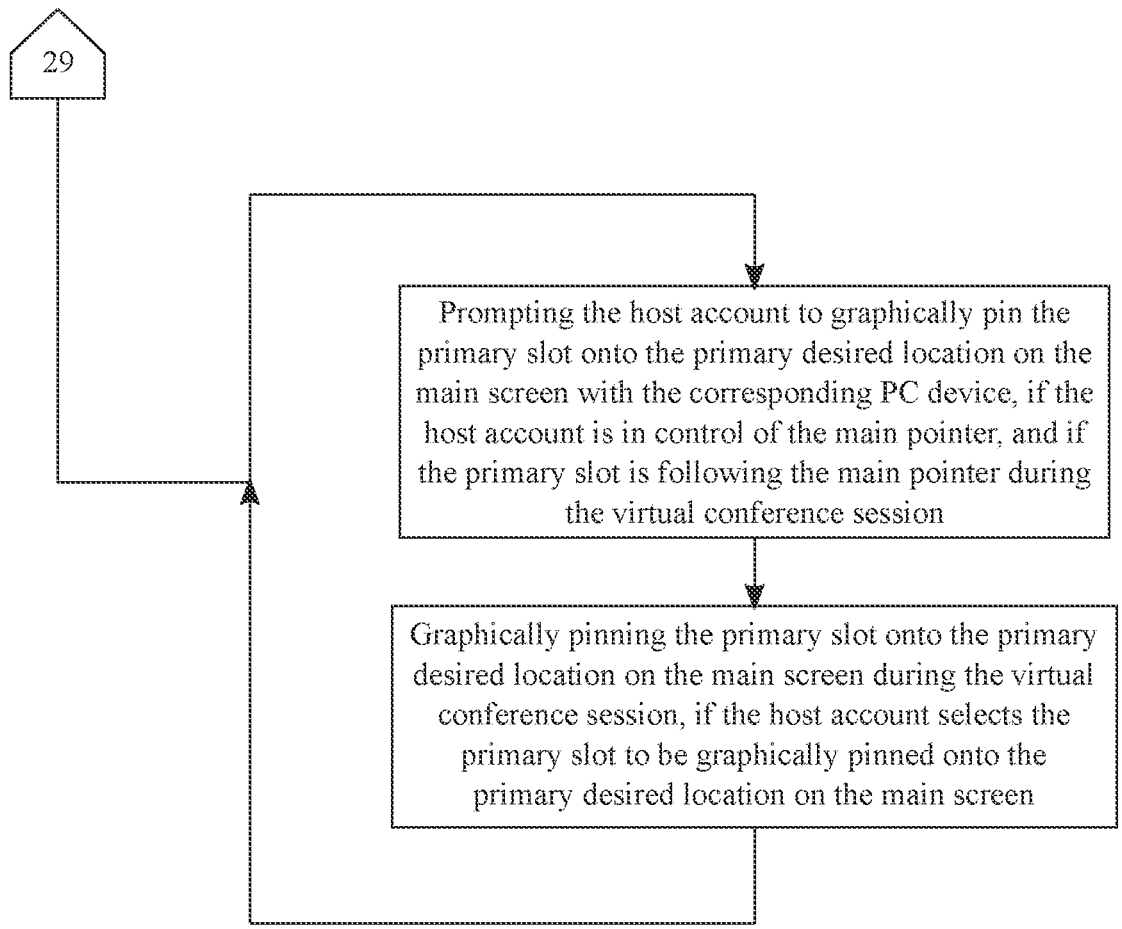
FIG. 30 is a flowchart depicting a subprocess of prompting and executing the host account to graphically pin the primary slot onto the primary desired location on the main screen, during the virtual conference session.

As can be seen in FIG. 30, a subprocess of the present invention comprises the steps of prompting the host account to graphically pin the primary slot onto the primary desired location with the corresponding PC device, if the host account is in control of the main pointer, and if the primary slot is following the main pointer during the virtual conference session. In other words, the host X may move and pin the host X account's feed video to any location on the main screen, if the host is in control of the main pointer. Further, the sub-process continues by graphically pinning the primary slot onto the primary desired location during the virtual conference session, if the host account selects the primary slot to be graphically pinned onto the primary desired location. Thus, during any part of the virtual conference session, the pinned primary slot will remain stationary and does not obstruct any shared video content.

Figure 31:
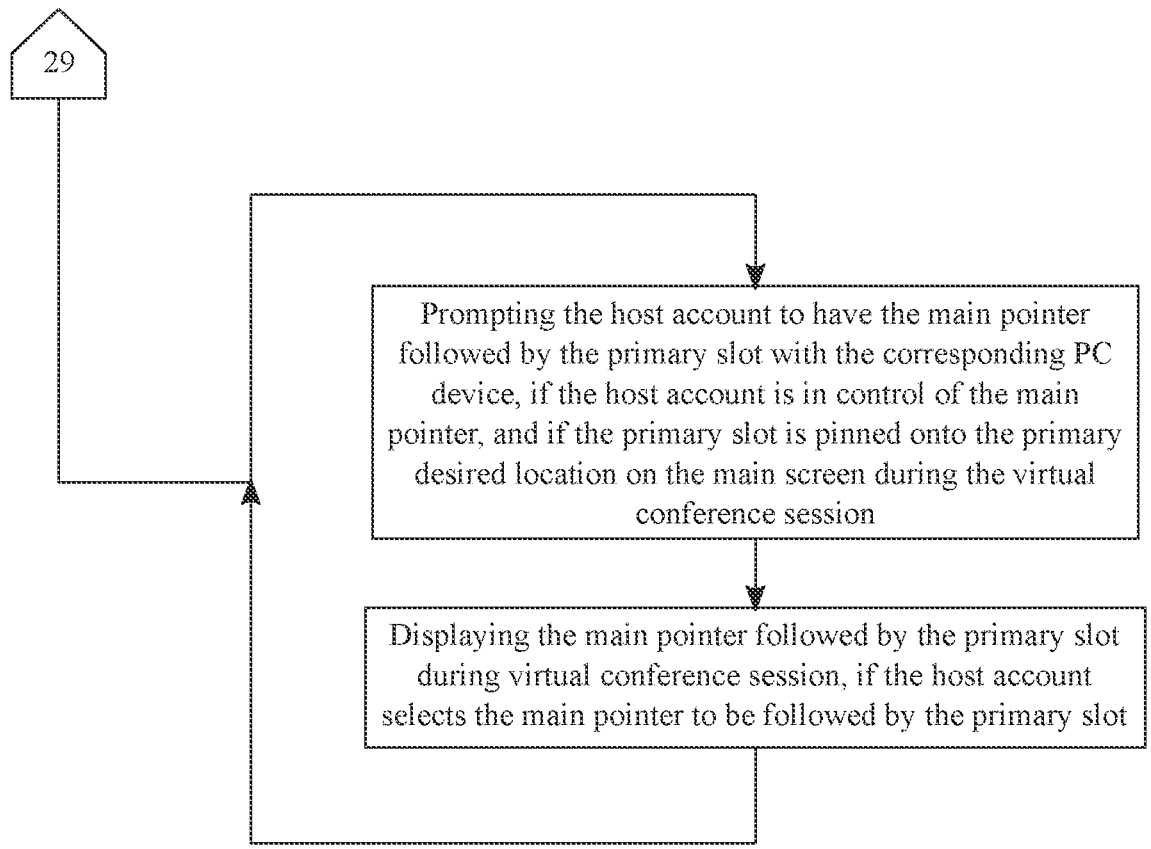
FIG. 31 is a flowchart depicting a subprocess of prompting the host account to have the main pointer follow the primary slot, and displaying the main pointer follow the primary slot, during the virtual conference session.

As can be seen in FIG. 31, a sub-process of the present invention comprises the steps of prompting the host account to have the main pointer followed by the primary slot with the corresponding PC device, if the host account is in control of the main pointer, and if the primary slot is pinned onto the primary desired location during the virtual conference session. That is, the main pointer will follow the primary slot anywhere the host X moves the primary slot. Further, the subprocess continues by displaying the main pointer followed by the primary slot during virtual conference session if the host account selects the main pointer to be followed by the primary slot.

Figure 32:
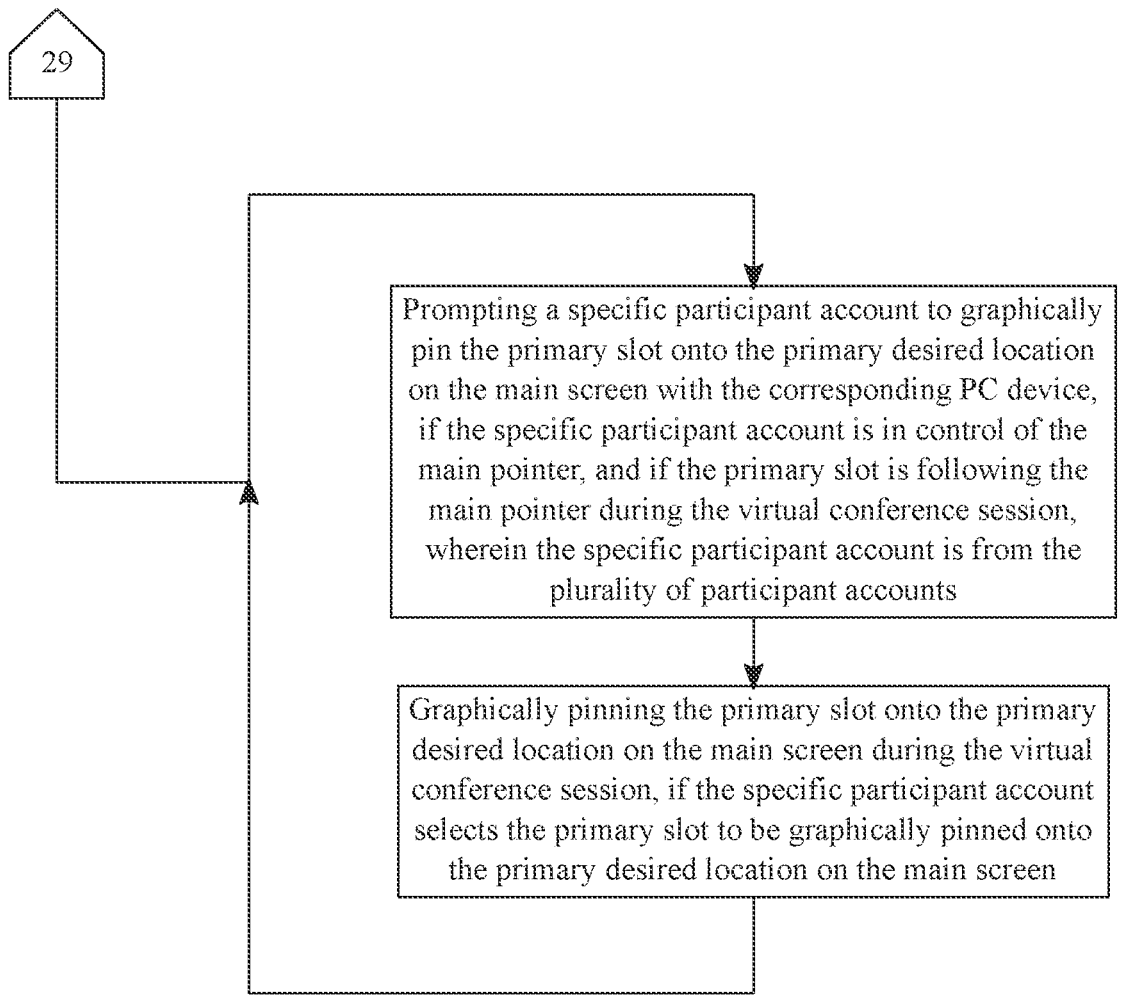
FIG. 32 is a flowchart depicting a subprocess of prompting and executing a specific participant account to graphically pin the primary slot onto the primary desired location on the main screen, during the virtual conference session.

As can be seen in FIG. 32, a sub-process of the present invention comprises the steps of prompting a specific participant account to graphically pin the primary slot onto the primary desired location on the main screen with the corresponding PC device, if the specific participant account is in control of the main pointer, and if the primary slot is following the main pointer during the virtual conference session, wherein the specific participant account is from the plurality of participant accounts. For example, if specific participant Z wants to pin the primary slot onto any specific point on the main screen, the specific participant Z has the option to do that. Further, the subprocess continues by graphically pinning the primary slot onto the primary desired location during the virtual conference session, if the specific participant account selects the primary slot to be graphically pinned onto the primary desired location on the main screen. This feature comes in handy if the primary slot is blocking the view of anything that is being presented or shared during the virtual conference session.

Figure 33:
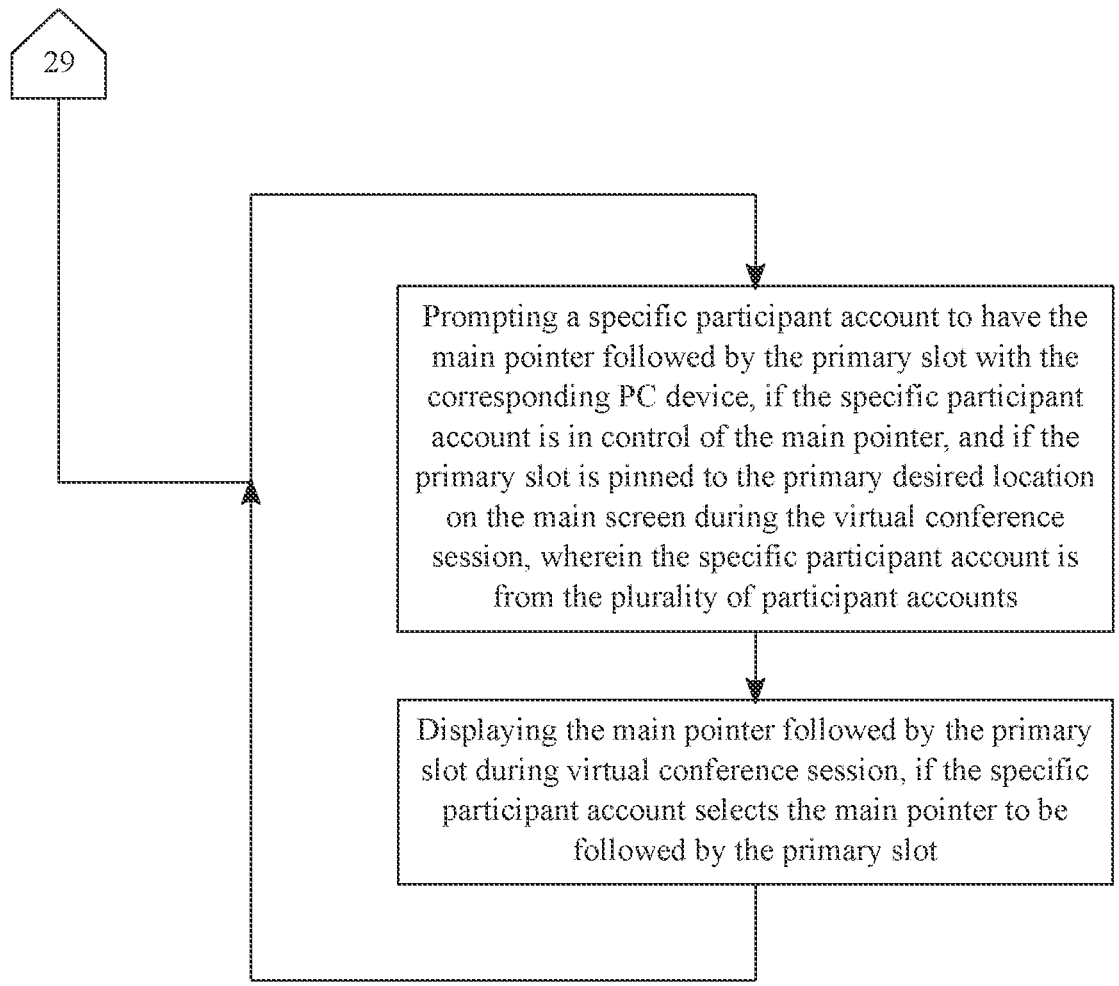
FIG. 33 is a flowchart depicting a subprocess of prompting the specific participant account to have the main pointer follow the primary slot and displaying the main pointer follow the primary slot, during the virtual conference session.

As can be seen in FIG. 33, a sub-process of the present invention comprises the steps of prompting a specific participant account to have the main pointer followed by the primary slot with the corresponding PC device, if the participant account is in control of the main pointer, and if the primary slot is pinned onto the primary desired location on the main screen during the virtual conference session, wherein the specific participant account is from the plurality of participant accounts. For example, if specific participant Z does not want to pin the primary slot onto any specific point on the main screen and wants the primary slot to follow the main pointer, then specific participant Z has the option to do that. The subprocess continues by displaying the main pointer followed by the primary slot during virtual conference session, if the participant account selects the main pointer to be followed by the primary slot.

Figure 34:
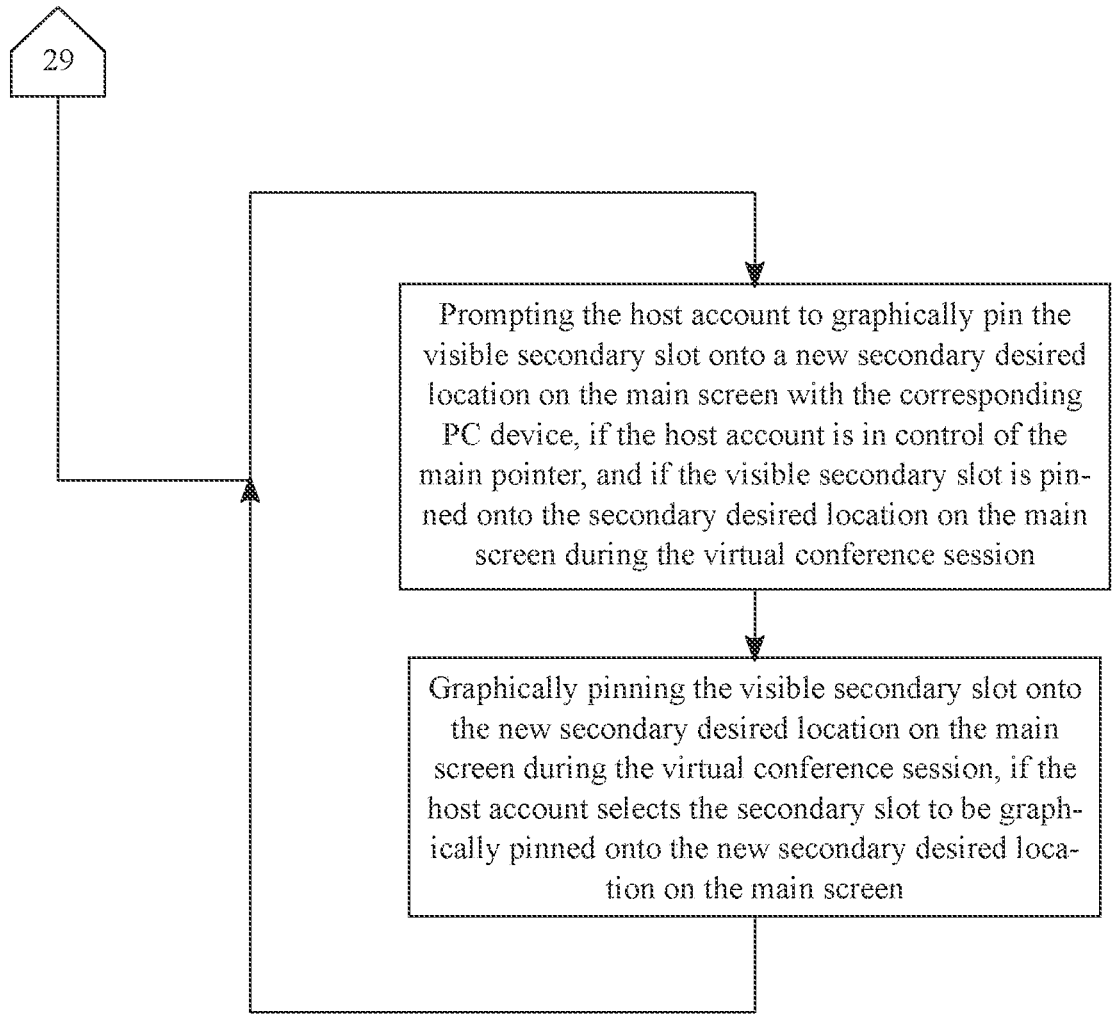
FIG. 34 is a flowchart depicting a subprocess of prompting and executing the host account to graphically pin the visible secondary slot onto a new secondary desired location on the main screen, during the virtual conference session.

As can be seen in FIG. 34, a sub-process of the present invention comprises the steps of, prompting the host account to graphically pin the visible secondary slot onto a new secondary desired location on the main screen with the corresponding PC device, if the host account is in control of the main pointer, and if the visible secondary slot is pinned onto the secondary desired location on the main screen during the virtual conference session. In other words, the host account has the ability to pin the visible secondary slots or the first row of participants on the main screen to a new location on the main screen. Thus, the sub-process continues by graphically pinning the visible secondary slot onto the new secondary desired location on the main screen during the virtual conference session, if the host account selects the secondary slot to be graphically pinned onto the new secondary desired location on the main screen.

Figure 35:
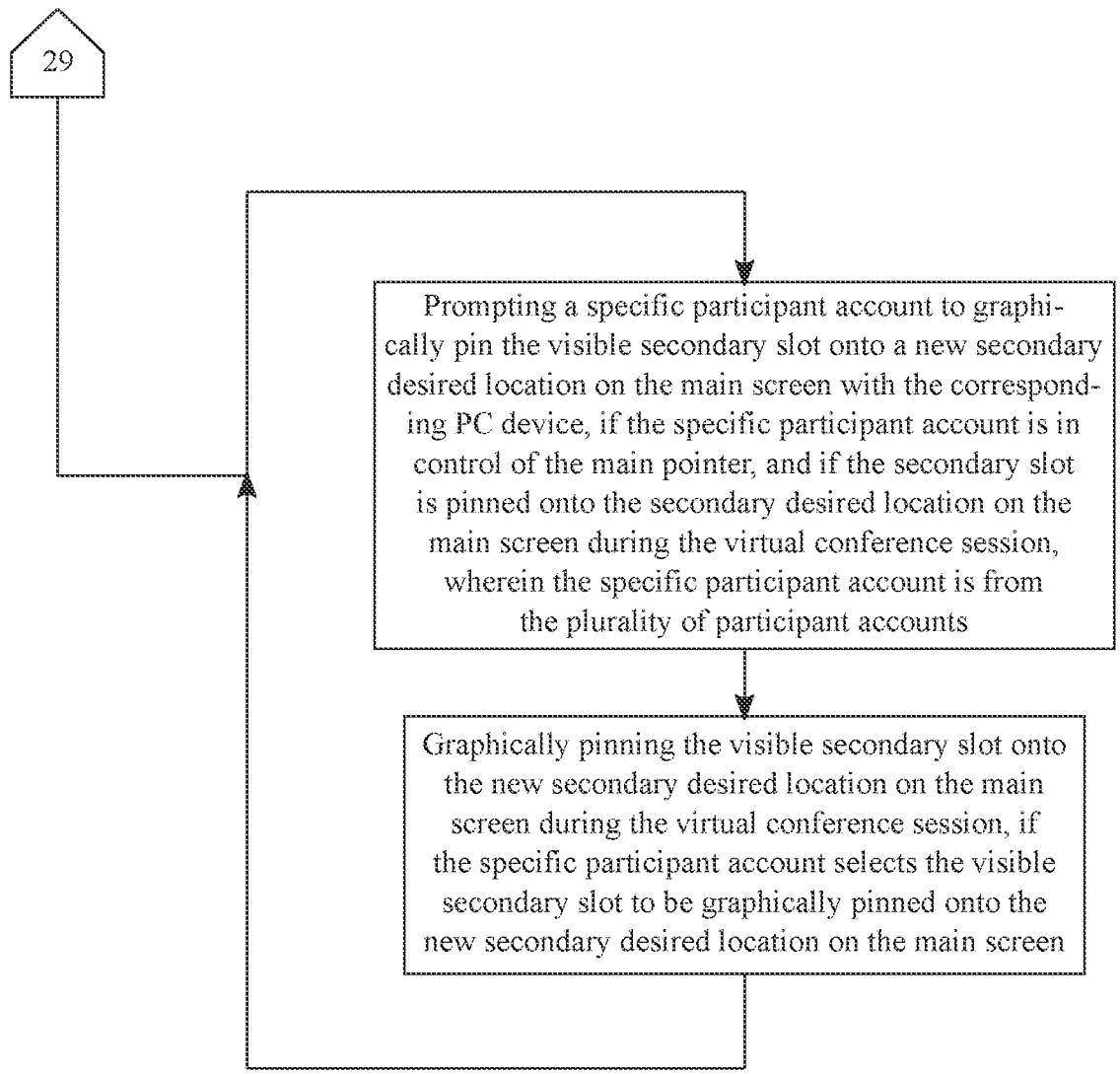
FIG. 35 is a flowchart depicting a subprocess of prompting and executing a specific participant account to graphically pin the new visible secondary slot onto a new secondary desired location on the main screen, during the virtual conference session.

As can be seen in FIG. 35, a sub-process of the present invention comprises the steps of, prompting a specific participant account to graphically pin the visible secondary slot onto a new secondary desired location on the main screen with the corresponding PC device, if the specific participant account is in control of the main pointer, and if the secondary slot is pinned onto the secondary desired location on the main screen during the virtual conference session, wherein the specific participant account is from the plurality of participant accounts. In other words, a specific participant from the plurality of participant accounts has the ability to pin the visible secondary slot onto a new location on the main screen, if he or she feels that the new location would enhance viewing of the shared content during the virtual conference session. Thus, the sub-process continues by graphically pinning the visible secondary slot onto the new secondary desired location on the main screen during the virtual conference session, if the specific participant account selects the visible secondary slot to be graphically pinned onto the new secondary desired location on the main screen.

Figure 36:
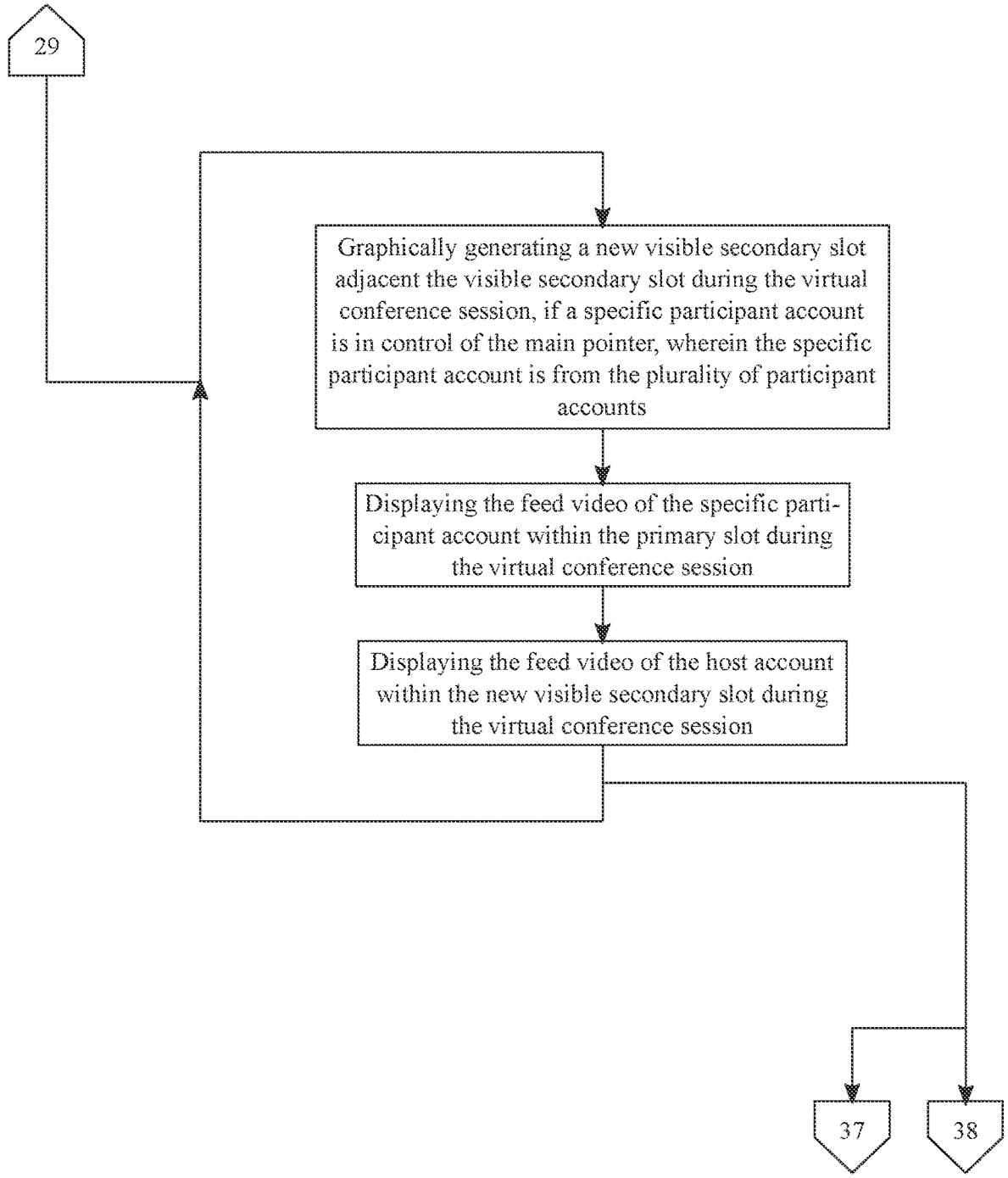
FIG. 36 is a flowchart depicting a subprocess of graphically generating a new visible secondary slot adjacent to the visible secondary slot.

As can be seen in FIG. 36, a sub-process of the present invention comprises the steps of, graphically generating a new visible secondary slot adjacent the visible secondary slot during the virtual conference session, if a specific participant account is in control of the main pointer, wherein the specific participant account is from the plurality of participant accounts. In other words, and as seen in FIG. y, the host switches to a new spot adjacent to the visible secondary slot or first row participants, when a participant takes the host's position in the primary slot. Thus, the sub-process continues by displaying the feed video of the specific participant account within the primary slot during the virtual conference session and displaying the feed video of the host account within the new visible secondary slot during the virtual conference session. In other words, the feed video of the host account moves into a newly generated spot or the new visible secondary slot, when the feed video of the specific participant takes the primary slot.

Figure 37:
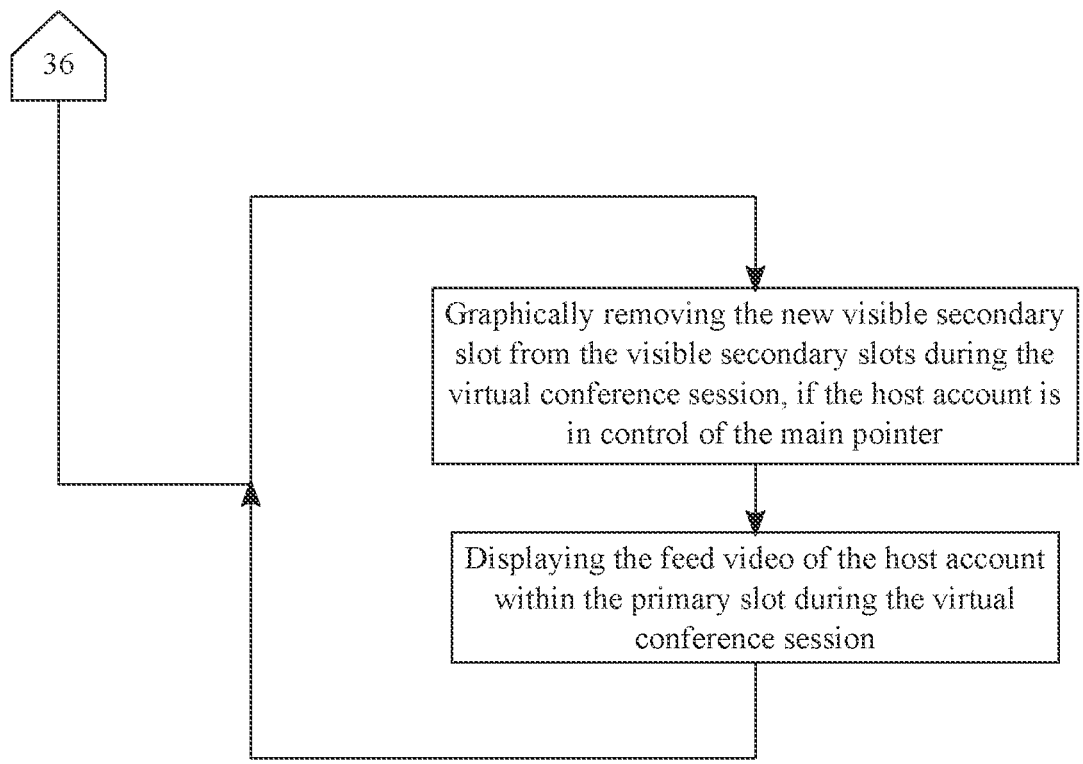
FIG. 37 is a flowchart depicting a subprocess of graphically removing the new visible secondary slot from the visible secondary slots.

As can be seen in FIG. 37, a sub-process of the present invention comprises the steps of, graphically removing the new visible secondary slot from the visible secondary slots during the virtual conference session, if the host account is in control of the main pointer. In other words, if the host takes back control of the main pointer and the primary slot, the new visible secondary slot is removed or disappears from the visible secondary slots. Subsequently, the sub-process continues by displaying the feed video of the host account within the primary slot during the virtual conference session.

Figure 5:
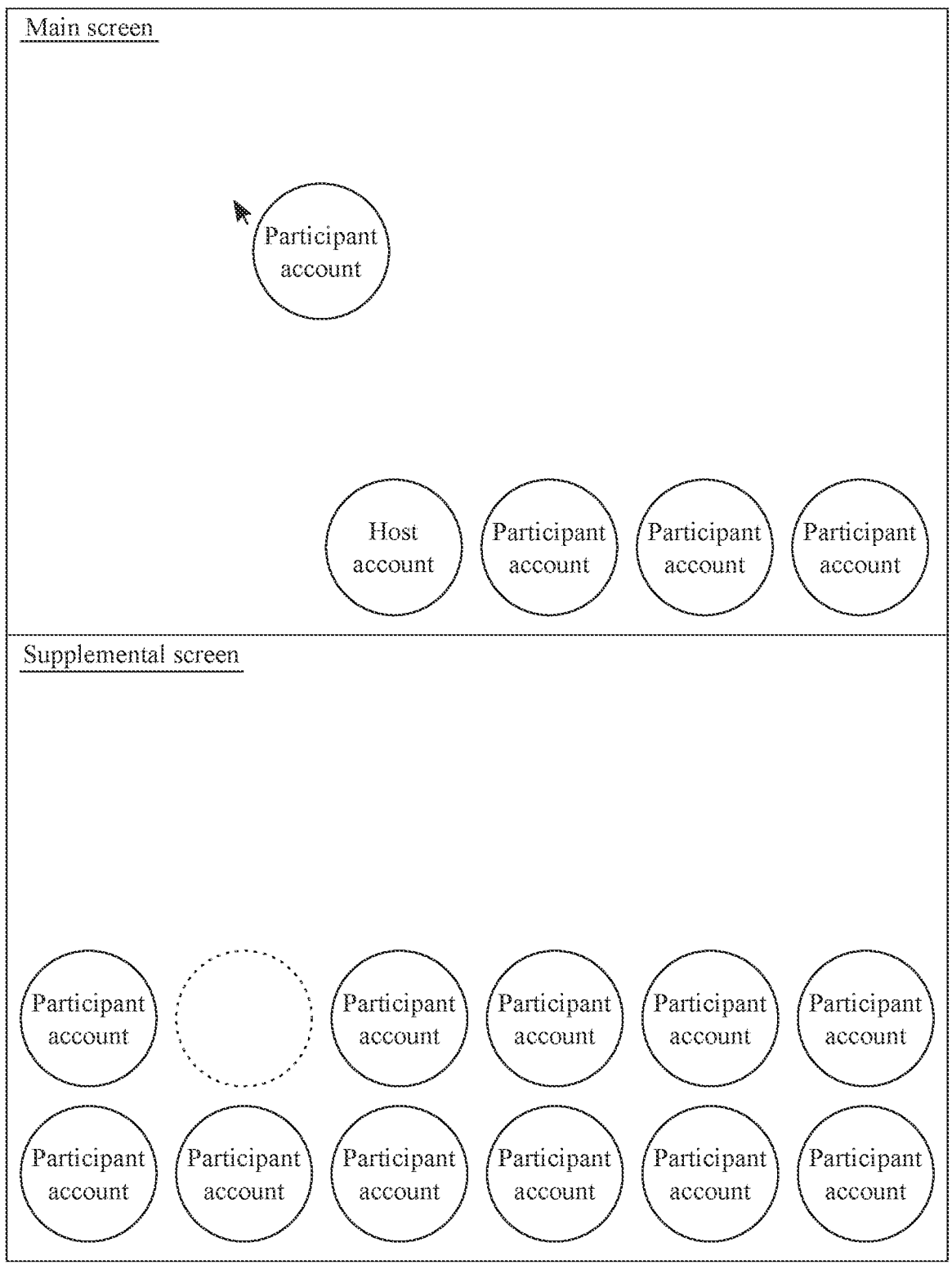
FIG. 5 is a schematic view of a second step of the sub-process from FIG. 4, wherein the slot of the specific participant is left empty when the specific participant moved to the primary slot.
Figure 6:
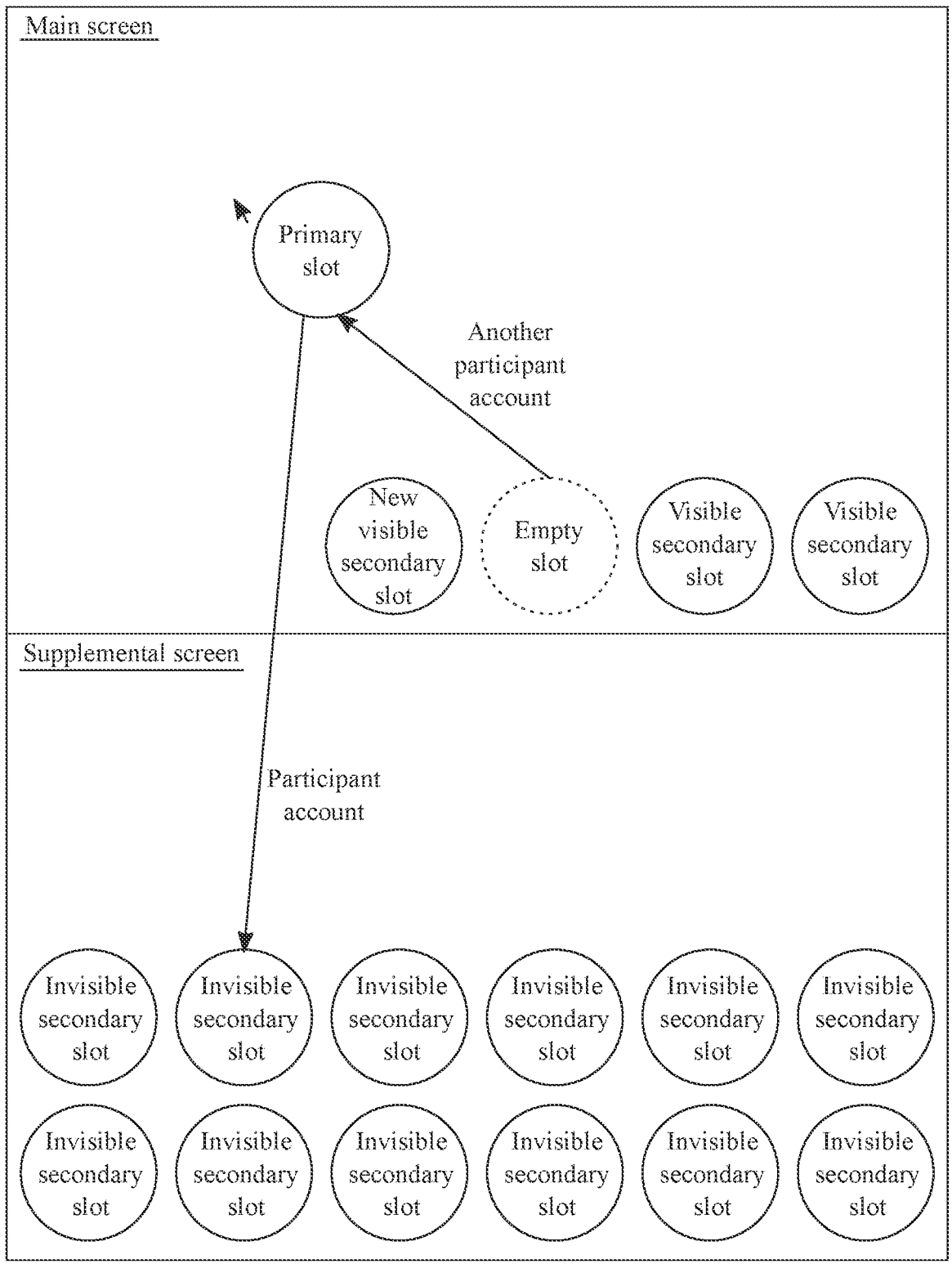
FIG. 6 is a schematic view of a first step of a sub-process of the present invention, that shows generation of an empty slot, when another participant account from the plurality of visible secondary slots moves to the primary slot and the specific participant in the primary slot returns to their former slot among the invisible secondary slots.
Figure 7:
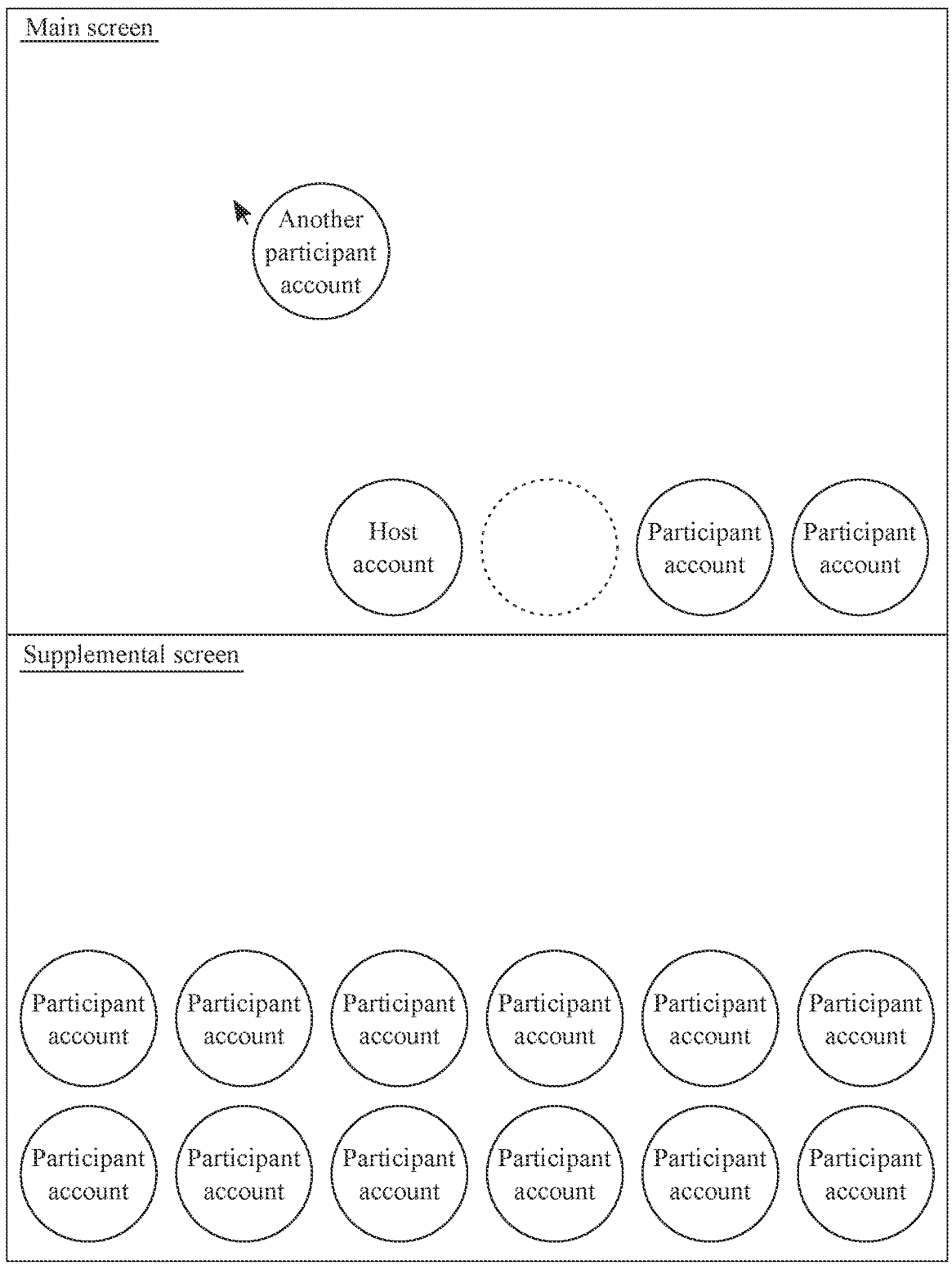
FIG. 7 is a schematic view of a second step of the sub-process from FIG. 6, that shows the primary slot being occupied by another participant account, and the another participant account's former slot among the visible secondary slots being left empty.
Figure 38:
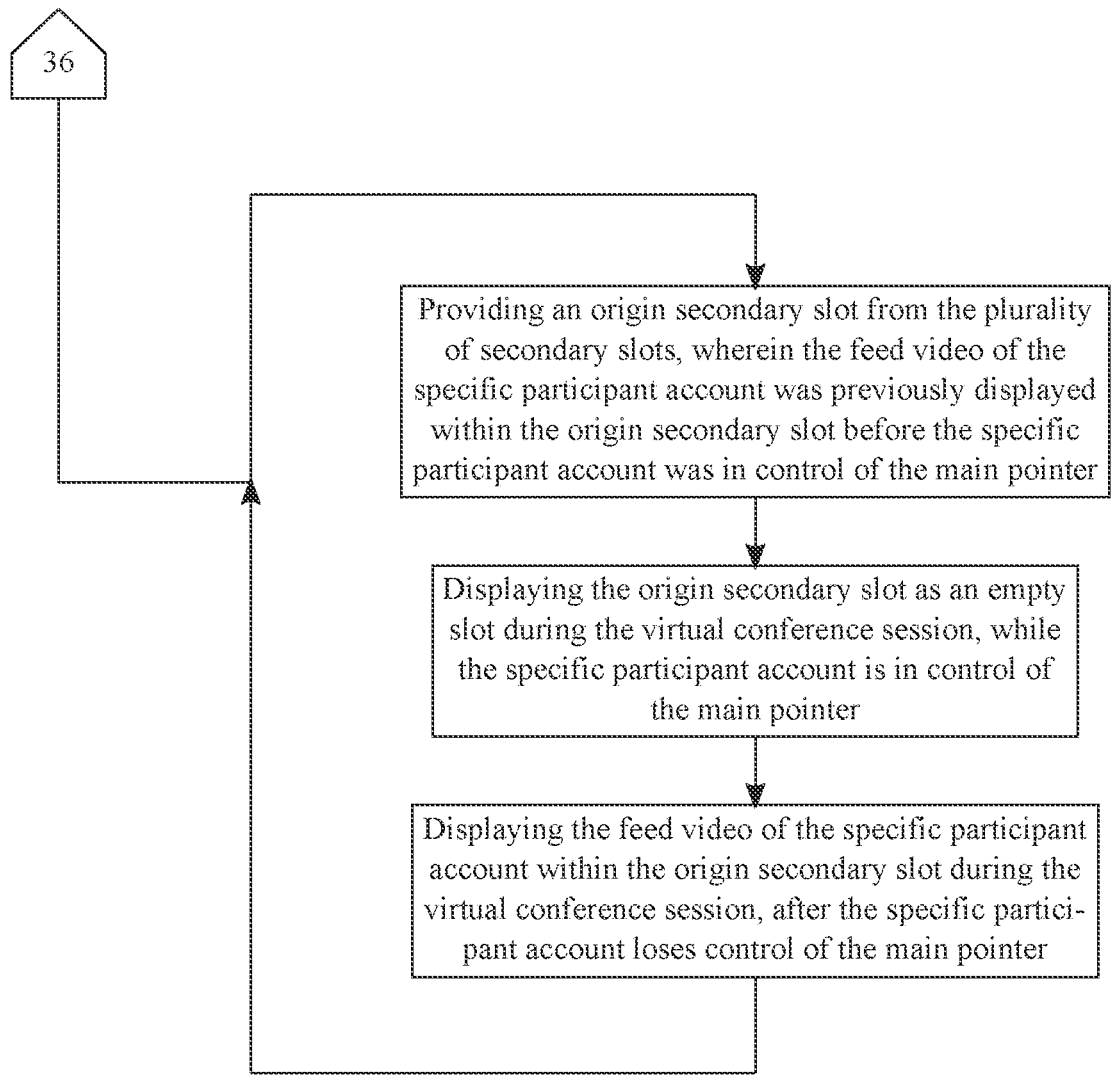
FIG. 38 is a flowchart depicting a subprocess of providing an origin secondary slot and displaying the feed video of the specific participant account within the origin second slot.

As can be seen in FIG. 38, a sub-process of the present invention comprises the steps of providing an origin secondary slot from the plurality of secondary slots, wherein the feed video of the specific participant account was previously displayed within the origin secondary slot before the specific participant account was in control of the main pointer. The sub-process continues by displaying the origin secondary slot as an empty slot during the virtual conference session, while the specific participant account is in control of the main pointer. For example, if the feed video of a specific participant Z was previously displayed in the origin secondary slot before the specific participant Z gained control of the main pointer by clicking on the primary slot, then that origin secondary slot is left empty while the specific participant Z's feed video is displayed in the primary slot. Further, as seen in FIG. 5 and FIG. 6, the specific participant Z may return to the origin secondary slot, after he or she loses control of the main pointer. To that end, the sub-process continues by displaying the feed video of the specific participant account within the origin secondary slot during the virtual conference session, after the specific participant account loses control of the main pointer.

Figure 39:
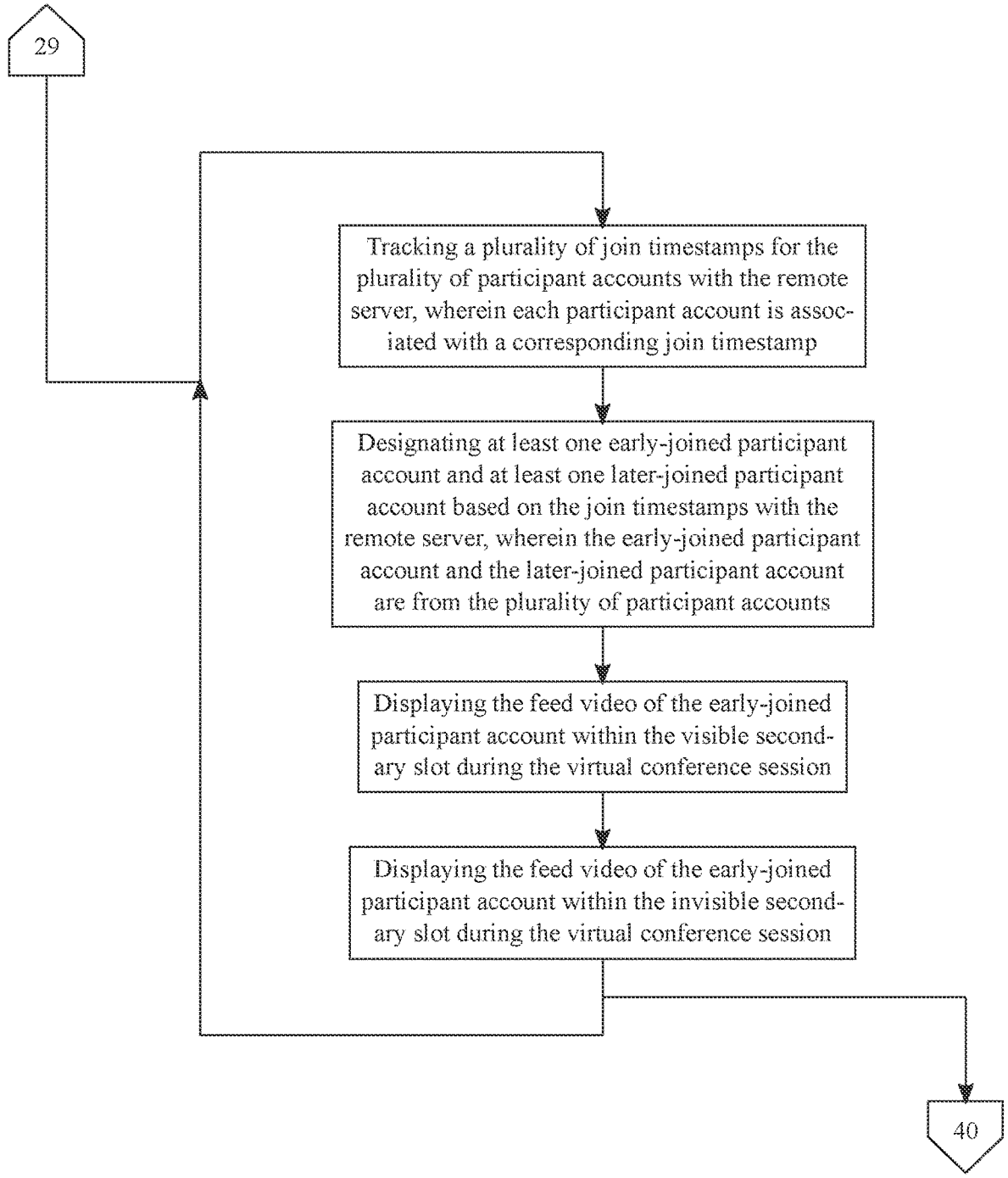
FIG. 39 is a flowchart depicting a subprocess of tracking a plurality of join timestamps, designating and displaying the feed video of early-joined participant account within the visible secondary slots and displaying the later-joined participant account within the invisible secondary slots.

As can be seen in FIG. 39, a sub-process of the present invention comprises the steps of tracking a plurality of join timestamps for the plurality of participant accounts with the remote server, wherein each participant account is associated with a corresponding join timestamp. In other words, the time at which each participant logs into the virtual conference session are tracked and saved. The sub-process continues by designating at least one early-joined participant account and at least one later-joined participant account based on the join timestamps with the remote server, wherein the early-joined participant account and the later-joined participant account are from the plurality of participant accounts. More specifically, the at least one early-joined participant account constitutes the first few attendee accounts who joined the meeting and the later-joined participant account constitutes subsequent joiners. The sub-process continues by displaying the feed video of the early-joined participant account within the visible secondary slot during the virtual conference session and displaying the feed video of the later-joined participant account within the invisible secondary slot during the virtual conference session. In other words, the early-joined participants' feed videos are displayed in the visible secondary slot or front row of participants, in the order in which they joined the meeting. Then on a separate audience screen or the invisible secondary slots are added in the supplement screen, as more and more later-joined participants log in to the virtual conference session.

Figure 40:
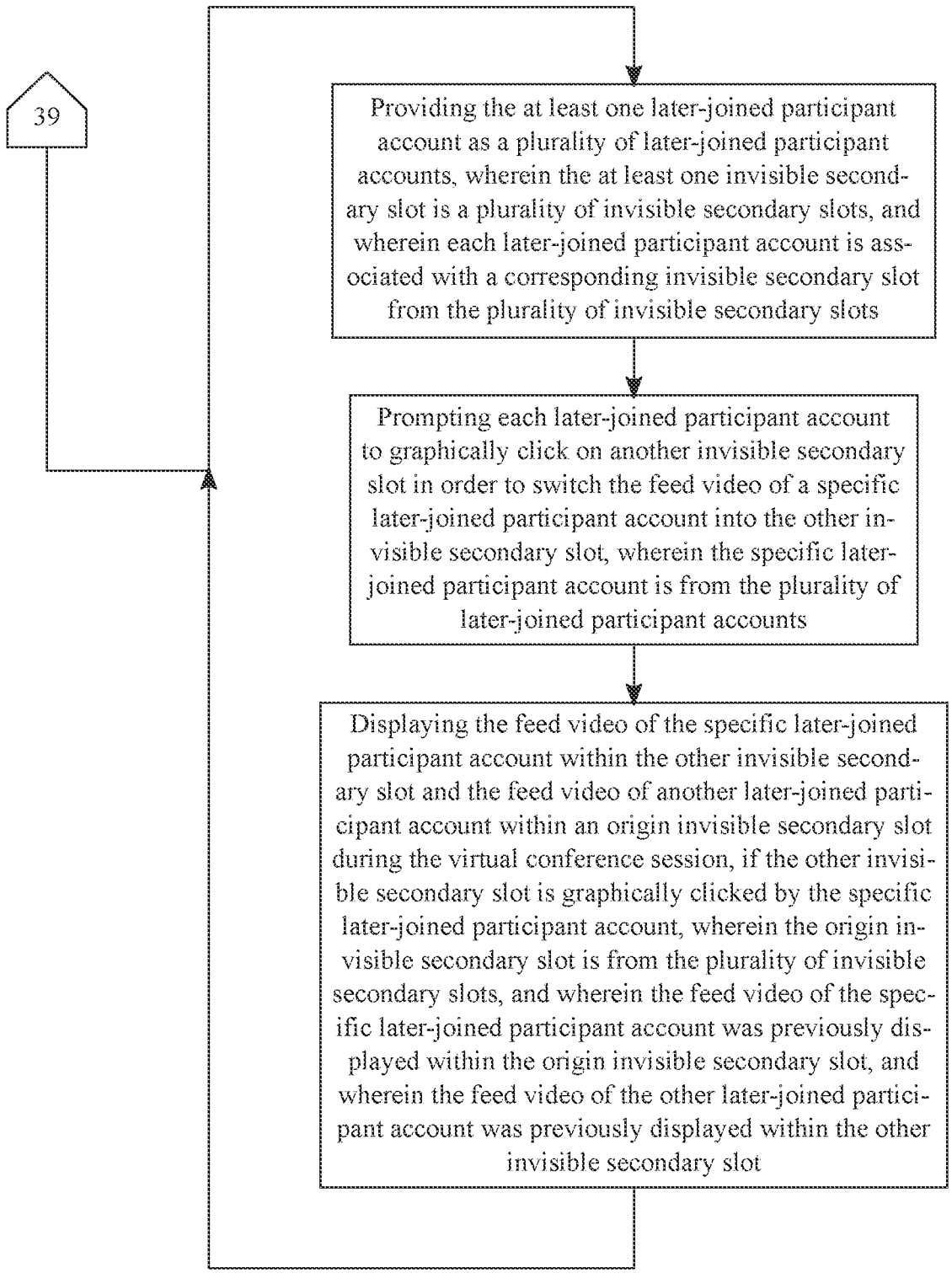
FIG. 40 is a flowchart depicting a subprocess of providing a plurality of later-joined participant accounts, prompting each later-joined participant account to graphically click and switch feed videos between origin invisible secondary slot and other invisible secondary slot.

As can be seen in FIG. 40, a sub-process of the present invention comprises the steps of providing the at least one later-joined participant account as a plurality of later-joined participant accounts, wherein the at least one invisible secondary slot is a plurality of invisible secondary slots, and wherein each later-joined participant account is associated with a corresponding invisible secondary slot from the plurality of invisible secondary slots. In other words, feed videos of the plurality of later-joined participant accounts are displayed in the plurality of invisible secondary slots, and each later-joined participant account is associated with one invisible slot. The sub-process continues by prompting each later-joined participant account to graphically click on another invisible secondary slot in order to switch the feed video of a specific later-joined participant account into the other invisible secondary slot, wherein the specific later-joined participant account is from the plurality of later-joined participant accounts. In other words, participants within the supplement page or in the audience page can choose to switch between the invisible secondary slots like switching seats in the real world. For example, a specific-later joined participant Z can choose to sit on K's slot (other invisible secondary slot). The sub-process further continues by displaying the feed video of the specific later-joined participant account within the other invisible secondary slot and the feed video of another later-joined participant account within an origin invisible secondary slot during the virtual conference session, if the other invisible secondary slot is graphically clicked by the specific later-joined participant account, wherein the origin invisible secondary slot is from the plurality of invisible secondary slots, and wherein the feed video of the specific later-joined participant account was previously displayed within the origin invisible secondary slot, and wherein the feed video of the other later-joined participant account was previously displayed within the other invisible secondary slot. In other words, if participant Z was originally in spot O (origin invisible secondary slot), and participant K was originally in spot L (other invisible secondary slot), and Z clicks on spot L, then feed video of K will be in displayed in spot O and feed video of Z will be displaced in spot L.

Figure 41:
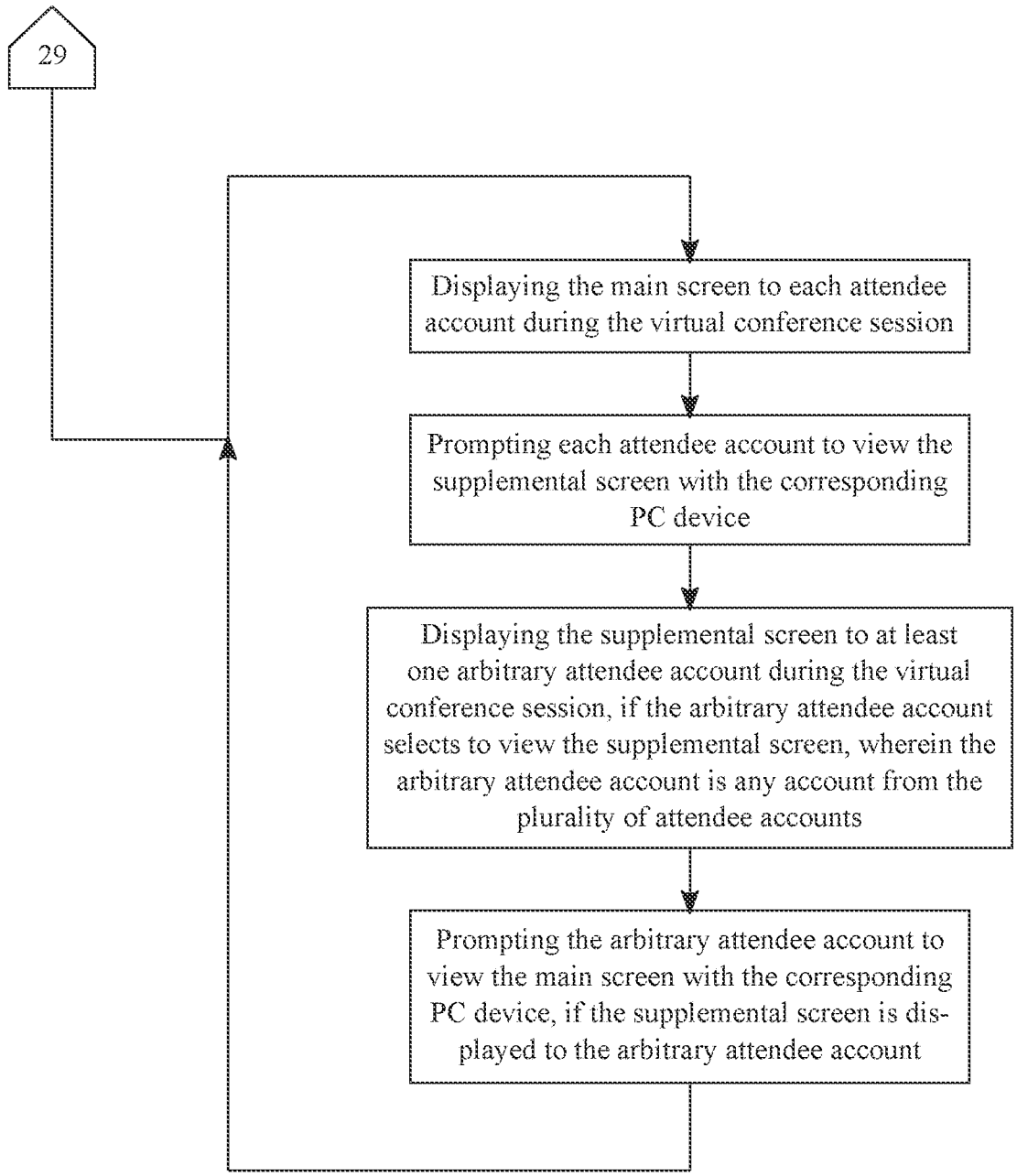
FIG. 41 is a flowchart depicting a subprocess of enabling each attendee account to switch between viewing the main screen and the supplemental screen.

As can be seen in FIG. 41, a sub-process of the present invention comprises the steps of displaying the main screen to each attendee account during the virtual conference session. The sub-process continues by prompting each attendee account to view the supplemental screen with the corresponding PC device. In other words, all the attendees of the meeting will primarily see the main page upon logging into the virtual conference session. To view the participants in the invisible secondary slots or the supplemental screen, each of the attendee account as to click on a button or select a tab that leads to the supplemental screen. To that end, the sub-process continues by displaying the supplemental screen to at least one arbitrary attendee account during the virtual conference session, if the arbitrary attendee account selects to view the supplemental screen, wherein the arbitrary attendee account is any account from the plurality of attendee accounts. The sub-process further continues by prompting the arbitrary attendee account to view the main screen with the corresponding PC device, if the supplemental screen is displayed to the arbitrary attendee account and displaying the main screen to the arbitrary attendee account during the virtual conference session, if the arbitrary attendee account selects to view the main screen. In other words, any arbitrary attendee account can choose between viewing the main screen and the supplemental screen at any point during the virtual conference session, upon making the appropriate selection.

In an alternate embodiment, the host of the session may grant the visible secondary slots additional rights such as microphone on all the time, or limit switching positions (slot seats). Additionally, when a user from the audience (invisible secondary slot) switches to the first row (visible secondary slot) then the grants are automatically granted. Further, when a first-row user (visible secondary slot) switches to the audience then rights are adjusted as well.

Although the invention has been explained in relation to its preferred embodiment, it is to be understood that many other possible modifications and variations can be made without departing from the spirit and scope of the invention.

What is claimed is:

1. A method for managing a graphic user interface (GUI) for a virtual conference call, the method comprising the steps of:
   (A) providing a plurality of user accounts managed by at least one remote server, wherein each user account is associated with a corresponding personal computing (PC) device;
   (B) providing at least one virtual conference session managed by the remote server, wherein the virtual conference session includes a plurality of attendee accounts, a main pointer, a primary slot, and at least one secondary slot, and wherein the attendee accounts are designated from the plurality of user accounts, and wherein the attendee accounts include a host account and at least one participant account, and wherein the primary slot is configured either to follow the main pointer during the virtual conference session or to be pinned to a primary desired location during the virtual conference session, and wherein the secondary slot is configured to be pinned to a secondary desired location during the virtual conference session;
   (C) receiving a feed video from each attendee account with the corresponding PC device;
   (D) initially displaying the feed video of the host account within the primary slot and the feed video of the participant account within the secondary slot during the virtual conference session;
   (E) prompting the participant account to graphically click on the primary slot with the corresponding PC device in order to switch the feed video of the participant account into the primary slot;
   (F) displaying the feed video of the participant account within the primary slot and the feed video of the host account within the secondary slot during the virtual conference session, if the primary slot is graphically clicked by the participant account;
   (G) enabling control of the main pointer with the corresponding PC device of the host account during the virtual conference session, if the feed video of host account is displayed within the primary slot;
   (H) enabling control of the main pointer with the corresponding PC device of the participant account during the virtual conference session, if the feed video of the participant account is displayed within the primary slot;
   prompting the host account to graphically pin the primary slot onto the primary desired location with the corresponding PC device, if the host account is in control of the main pointer, and if the primary slot is following the main pointer during the virtual conference session;

graphically pinning the primary slot onto the primary desired location during the virtual conference session, if the host account selects the primary slot to be graphically pinned onto the primary desired location;

prompting the host account to have the main pointer followed by the primary slot with the corresponding PC device, if the host account is in control of the main pointer, and if the primary slot is pinned onto the primary desired location during the virtual conference session; and displaying the main pointer followed by the primary slot during virtual conference session, if the host account selects the main pointer to be followed by the primary slot.

2. The method as claimed in claim 1 comprising the steps of:

prompting the host account to graphically click on the secondary slot with the corresponding PC device after step (G) in order to switch the feed video of the participant account into the primary slot; and displaying the feed video of the participant account within the primary slot and the feed video of the host account within the secondary slot during the virtual conference session, if the secondary slot is graphically clicked by the host account.

3. The method as claimed in claim 1 comprising the steps of:

prompting the host account to graphically click on the primary slot with the corresponding PC device after step (H) in order to switch the feed video of the host account into the primary slot; and displaying the feed video of the host account within the primary slot and the feed video of the participant account within the secondary slot during the virtual conference session, if the primary slot is graphically clicked by the host account.

4. The method as claimed in claim 1 comprising the steps of:

prompting the participant account to graphically pin the primary slot onto the primary desired location with the corresponding PC device, if the participant account is in control of the main pointer, and if the primary slot is following the main pointer during the virtual conference session;

graphically pinning the primary slot onto the primary desired location during the virtual conference session, if the participant account selects the primary slot to be graphically pinned onto the primary desired location;

prompting the participant account to have the main pointer followed by the primary slot with the corresponding PC device, if the participant account is in control of the main pointer, and if the primary slot is pinned onto the primary desired location during the virtual conference session; and displaying the main pointer followed by the primary slot during virtual conference session, if the participant account selects the main pointer to be followed by the primary slot.

5. The method as claimed in claim 1 comprising the steps of:

prompting the host account to graphically pin the secondary slot onto a new secondary desired location with the corresponding PC device, if the host account is in control of the main pointer, and if the secondary slot is pinned to the secondary desired location during the virtual conference session; and graphically pinning the secondary slot onto the new secondary desired location during the virtual conference session, if the host account selects the secondary slot to be graphically pinned onto the new secondary desired location.

6. The method as claimed in claim 1 comprising the steps of:

prompting the participant account to graphically pin the secondary slot onto a new secondary desired location with the corresponding PC device, if the participant account is in control of the main pointer, and if the secondary slot is pinned onto the secondary desired location during the virtual conference session; and graphically pinning the secondary slot onto the new secondary desired location during the virtual conference session, if the participant account selects the secondary slot to be graphically pinned onto the new secondary desired location.

7. The method as claimed in claim 1 comprising the steps of:

providing each attendee account with a default background;

prompting the host account to select a shared screen content for the virtual conference session with the corresponding PC device, if the host account is in control of the main pointer;

displaying the shared screen content during the virtual conference session, if the shared screen content is selected by the host account; and displaying the default background for each attendee account with the corresponding PC device, if the host account is in control of the main pointer, and if the shared screen content is not selected by the host account.

8. The method as claimed in claim 7 comprising the steps of:

prompting each attendee account to select a desired background with the corresponding PC device;

relaying a selection for the desired background from the corresponding PC device of at least one arbitrary account to the remote server, if the desired background is selected by the arbitrary account, wherein the arbitrary account is any account from the plurality of attendee accounts; and designating the desired background as the default background for the arbitrary account with the remote server.

9. The method as claimed in claim 7 comprising the steps of:

providing a plurality of previous conference recordings stored on the remote server;

prompting the host account to replay a specific recording from the plurality of previous conference recordings with the corresponding PC device;

relaying a selection of the specific recording from the corresponding PC device of the host account to the remote server, if the specific recording is selected by the host account; and designating the specific recording as the shared screen content with the remote server, if the shared screen content is selected by the host account.

10. The method as claimed in claim 1 comprising the steps of:

providing each attendee account with a default background;

prompting the participant account to select a shared screen content for the virtual conference session with the corresponding PC device, if the participant account is in control of the main pointer;

displaying the shared screen content during the virtual conference session, if the shared screen content is selected by the participant account; and displaying the default background for each attendee account with the corresponding PC device, if the participant account is in control of the main pointer, and if the shared screen content is not selected by the participant account.

11. The method as claimed in claim 10 comprising the steps of:

prompting each attendee account to select a desired background with the corresponding PC device;

relaying a selection for the desired background from the corresponding PC device of at least one arbitrary account to the remote server, if the desired background is selected by the arbitrary account, wherein the arbitrary account is any account from the plurality of attendee accounts; and designating the desired background as the default background for the arbitrary account with the remote server.

12. The method as claimed in claim 10 comprising the steps of:

providing a plurality of previous conference recordings stored on the remote server;

prompting the participant account to replay a specific recording from the plurality of previous conference recordings with the corresponding PC device;

relaying a selection of the specific recording from the corresponding PC device of the participant account to the remote server, if the specific recording is selected by the participant account; and designating the specific recording as the shared screen content with the remote server, if the shared screen content is selected by the participant account.

13. The method as claimed in claim 1 comprising the steps of:

prompting each attendee account to select a desired profile image with the corresponding PC device after step (C);

relaying a selection for the desired profile image from the corresponding PC device of at least one arbitrary account to the remote server, if the desired profile image is selected by the arbitrary account, wherein the arbitrary account is any account from the plurality of attendee accounts;

prompting the arbitrary account to output the desired profile image with the corresponding PC device; and replacing the feed video of the arbitrary account by the desired profile image of the arbitrary account with the remote server during steps (D) and (F), if the desired profile image is selected to be outputted by the arbitrary account.

14. The method as claimed in claim 1 comprising the steps of:

providing each attendee account with a default profile image;

prompting each attendee account to select a desired profile image with the corresponding PC device after step (C);

relaying a selection for the desired profile image from the corresponding PC device of at least one arbitrary account to the remote server, if the desired profile image is selected by the arbitrary account, wherein the arbitrary account is any account from the plurality of attendee accounts;

replacing the feed video of the arbitrary account by the desired profile image of the arbitrary account with the remote server during steps (D) and (F), if the desired profile image is selected by the arbitrary account, and if the feed video is unavailable; and replacing the feed video of the arbitrary account by the default profile image of the arbitrary account with the remote server during steps (D) and (F), if the desired profile image is not selected by the arbitrary account, and if the feed video is unavailable.

15. The method as claimed in claim 1 comprising the steps of:

prompting the host account to enter at least one cursor movement with the corresponding PC device;

executing the cursor movement with the main pointer during the virtual conference session, if the cursor movement is entered by the host account, and if the feed video of host account is displayed within the primary slot; and executing the cursor movement with a separate pointer during the virtual conference session, if the cursor movement is entered by the host account, and if the feed video of host account is displayed within the secondary slot, wherein the separate pointer is only displayed with the corresponding PC device of the host account.

16. The method as claimed in claim 1 comprising the steps of:

prompting the participant account to enter at least one cursor movement with the corresponding PC device;

executing the cursor movement with the main pointer during the virtual conference session, if the cursor movement is entered by the participant account, and if the feed video of participant account is displayed within the primary slot; and executing the cursor movement with a separate pointer during the virtual conference session, if the cursor movement is entered by the participant account, and if the feed video of participant account is displayed within the secondary slot, wherein the separate pointer is only displayed with the corresponding PC device of the participant account.

17. The method as claimed in claim 1, wherein a graphical size of the primary slot is larger than or is equal to a graphical size of the secondary slot.

18. The method as claimed in claim 1 comprising the steps of:

providing a plurality of slot shapes stored on the remote server;

prompting each attendee account to select a specific slot shape from the plurality of slot shapes with the corresponding PC device;

relaying a selection for the specific slot shape from the corresponding PC device of at least one arbitrary account to the remote server, if the specific slot shape is selected by the arbitrary account, and wherein the arbitrary account is any account from the plurality of attendee accounts; and graphically configuring the primary slot and the secondary slot into the specific slot shape during the virtual conference session, wherein the specific slot shape is displayed with the corresponding PC device of the arbitrary account.

19. The method as claimed in claim 1, wherein the at least one participant account is a plurality of participant accounts, and wherein the at least one secondary slot is a plurality of secondary slots, and wherein the plurality of secondary slots includes at least one visible secondary slot and at least one invisible secondary slot, and wherein the virtual conference session includes a main screen and a supplemental screen, and wherein the primary slot and the visible secondary slot are configured to be displayed on the main screen, and wherein the invisible secondary slot is configured to be displayed on the supplemental screen, and wherein a plurality of session slots includes the primary slot and the plurality of secondary slots, and wherein the feed video of each attendee account is displayed within a corresponding slot from the plurality of session slots.

20. The method as claimed in claim 19 comprising the steps of:
   prompting the host account to graphically pin the primary slot onto the primary desired location on the main screen with the corresponding PC device, if the host account is in control of the main pointer, and if the primary slot is following the main pointer during the virtual conference session;
   graphically pinning the primary slot onto the primary desired location on the main screen during the virtual conference session, if the host account selects the primary slot to be graphically pinned onto the primary desired location on the main screen;
   prompting the host account to have the main pointer followed by the primary slot with the corresponding PC device, if the host account is in control of the main pointer, and if the primary slot is pinned onto the primary desired location on the main screen during the virtual conference session; and
   displaying the main pointer followed by the primary slot during virtual conference session, if the host account selects the main pointer to be followed by the primary slot.

21. The method as claimed in claim 19 comprising the steps of:
   prompting a specific participant account to graphically pin the primary slot onto the primary desired location on the main screen with the corresponding PC device, if the specific participant account is in control of the main pointer, and if the primary slot is following the main pointer during the virtual conference session, wherein the specific participant account is from the plurality of participant accounts; and
   graphically pinning the primary slot onto the primary desired location on the main screen during the virtual conference session, if the specific participant account selects the primary slot to be graphically pinned onto the primary desired location on the main screen.

22. The method as claimed in claim 19 comprising the steps of:
   prompting a specific participant account to have the main pointer followed by the primary slot with the corresponding PC device, if the specific participant account is in control of the main pointer, and if the primary slot is pinned to the primary desired location on the main screen during the virtual conference session, wherein the specific participant account is from the plurality of participant accounts; and
   displaying the main pointer followed by the primary slot during virtual conference session, if the specific participant account selects the main pointer to be followed by the primary slot; slot.

23. The method as claimed in claim 19 comprising the steps of:
   prompting the host account to graphically pin the visible secondary slot onto a new secondary desired location on the main screen with the corresponding PC device, if the host account is in control of the main pointer, and if the visible secondary slot is pinned onto the secondary desired location on the main screen during the virtual conference session; and
   graphically pinning the visible secondary slot onto the new secondary desired location on the main screen during the virtual conference session, if the host account selects the secondary slot to be graphically pinned onto the new secondary desired location on the main screen.

24. The method as claimed in claim 19 comprising the steps of:
   prompting a specific participant account to graphically pin the visible secondary slot onto a new secondary desired location on the main screen with the corresponding PC device, if the specific participant account is in control of the main pointer, and if the secondary slot is pinned onto the secondary desired location on the main screen during the virtual conference session, wherein the specific participant account is from the plurality of participant accounts; and
   graphically pinning the visible secondary slot onto the new secondary desired location on the main screen during the virtual conference session, if the specific participant account selects the visible secondary slot to be graphically pinned onto the new secondary desired location on the main screen.

25. The method as claimed in claim 19 comprising the steps of:
   graphically generating a new visible secondary slot adjacent the visible secondary slot during the virtual conference session, if a specific participant account is in control of the main pointer, wherein the specific participant account is from the plurality of participant accounts;
   displaying the feed video of the specific participant account within the primary slot during the virtual conference session;
   displaying the feed video of the host account within the new visible secondary slot during the virtual conference session;
   graphically removing the new visible secondary slot from the visible secondary slots during the virtual conference session, if the host account is in control of the main pointer; and
   displaying the feed video of the host account within the primary slot during the virtual conference session.

26. The method as claimed in claim 25 comprising the steps of:
   providing an origin secondary slot from the plurality of secondary slots, wherein the feed video of the specific participant account was previously displayed within the origin secondary slot before the specific participant account was in control of the main pointer;
   displaying the origin secondary slot as an empty slot during the virtual conference session, while the specific participant account is in control of the main pointer; and
   displaying the feed video of the specific participant account within the origin secondary slot during the virtual conference session, after the specific participant account loses control of the main pointer.

27. The method as claimed in claim 19 comprising the steps of:

tracking a plurality of join timestamps for the plurality of participant accounts with the remote server, wherein each participant account is associated with a corresponding join timestamp;

designating at least one early-joined participant account and at least one later-joined participant account based on the join timestamps with the remote server, wherein the early-joined participant account and the later-joined participant account are from the plurality of participant accounts;

displaying the feed video of the early-joined participant account within the visible secondary slot during the virtual conference session; and displaying the feed video of the later-joined participant account within the invisible secondary slot during the virtual conference session.

28. The method as claimed in claim 27 comprising the steps of:

providing the at least one later-joined participant account as a plurality of later-joined participant accounts, wherein the at least one invisible secondary slot is a plurality of invisible secondary slots, and wherein each later-joined participant account is associated with a corresponding invisible secondary slot from the plurality of invisible secondary slots;

prompting each later-joined participant account to graphically click on another invisible secondary slot in order to switch the feed video of a specific later-joined participant account into the other invisible secondary slot, wherein the specific later-joined participant account is from the plurality of later-joined participant accounts; and displaying the feed video of the specific later-joined participant account within the other invisible secondary slot and the feed video of another later-joined participant account within an origin invisible secondary slot during the virtual conference session, if the other invisible secondary slot is graphically clicked by the specific later-joined participant account, wherein the origin invisible secondary slot is from the plurality of invisible secondary slots, and wherein the feed video of the specific later-joined participant account was previously displayed within the origin invisible secondary slot, and wherein the feed video of the other later-joined participant account was previously displayed within the other invisible secondary slot.

29. The method as claimed in claim 19 comprising the steps of:

displaying the main screen to each attendee account during the virtual conference session;

prompting each attendee account to view the supplemental screen with the corresponding PC device;

displaying the supplemental screen to at least one arbitrary attendee account during the virtual conference session, if the arbitrary attendee account selects to view the supplemental screen, wherein the arbitrary attendee account is any account from the plurality of attendee accounts;

prompting the arbitrary attendee account to view the main screen with the corresponding PC device, if the supplemental screen is displayed to the arbitrary attendee account; and displaying the main screen to the arbitrary attendee account during the virtual conference session, if the arbitrary attendee account selects to view the main screen.

* * * * *